US009832197B2

(12) United States Patent
Nakamura et al.

(10) Patent No.: US 9,832,197 B2
(45) Date of Patent: Nov. 28, 2017

(54) GENERATING LINK INFORMATION TO ACCESS A FILE STORED IN A STORAGE AREA ASSOCIATED WITH USER IDENTIFICATION INFORMATION

(71) Applicants: Shuuichi Nakamura, Kanagawa (JP); Shinya Mukasa, Shizuoka (JP)

(72) Inventors: Shuuichi Nakamura, Kanagawa (JP); Shinya Mukasa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 2 days.

(21) Appl. No.: 14/488,466

(22) Filed: Sep. 17, 2014

(65) Prior Publication Data

US 2015/0082457 A1 Mar. 19, 2015

(30) Foreign Application Priority Data

Sep. 17, 2013 (JP) ................................ 2013-191847
Jul. 9, 2014 (JP) ................................ 2014-141126

(51) Int. Cl.
*G06F 21/62* (2013.01)
*H04L 29/06* (2006.01)

(52) U.S. Cl.
CPC .......... *H04L 63/10* (2013.01); *G06F 21/6236* (2013.01); *G06F 2221/2101* (2013.01)

(58) Field of Classification Search
CPC ............. G06F 21/10; G06F 2221/0788; G06F 2221/0793; H04L 63/10
USPC ...................................................... 726/27, 3
See application file for complete search history.

(56) References Cited

U.S. PATENT DOCUMENTS

| 2006/0277229 | A1* | 12/2006 | Yoshida ............ G06F 17/30011 707/769 |
| 2007/0047006 | A1* | 3/2007 | Sakai ................... G06F 3/1207 358/400 |
| 2009/0083317 | A1* | 3/2009 | Yoshihara ......... G06F 17/30165 707/999.103 |

(Continued)

FOREIGN PATENT DOCUMENTS

| JP | 2001-051928 | 2/2001 |
| JP | 2007-199998 | 8/2007 |

(Continued)

*Primary Examiner* — Haresh N Patel
(74) *Attorney, Agent, or Firm* — Oblon, McClelland, Maier & Neustadt, L.L.P.

(57) ABSTRACT

An information processing apparatus includes a memory that includes a first storage area and a second storage area and a processor that generates link information to access the file stored in the first storage area, in the second storage area associated with the user identification information associated with the first storage area, requests a notification server that transmits a notification, with identification information that identifies a communication apparatus that corresponds to the user identification information associated with the first storage area, and transfers, in response to a request from the communication apparatus that receives the notification, the link information stored in the second storage area associated with the user identification information corresponding to the communication apparatus and that further transfers, in response to access of the file by the communication apparatus using the link information, the file obtained from the first area to the communication apparatus.

14 Claims, 29 Drawing Sheets

(56) References Cited

U.S. PATENT DOCUMENTS

| | | | |
|---|---|---|---|
| 2009/0157627 A1* | 6/2009 | Arthursson | G06F 9/45504 707/999.003 |
| 2010/0036889 A1* | 2/2010 | Joshi | G06F 17/30194 707/821 |
| 2011/0072036 A1* | 3/2011 | Agsen | G06F 8/38 707/769 |
| 2012/0331108 A1* | 12/2012 | Ferdowsi | H04L 67/06 709/219 |
| 2013/0091557 A1* | 4/2013 | Gurrapu | H04W 4/003 726/5 |
| 2014/0068401 A1* | 3/2014 | Kirigin | G06F 17/30884 715/205 |
| 2014/0215568 A1* | 7/2014 | Kirigin | G06F 21/00 726/4 |
| 2014/0223527 A1* | 8/2014 | Bortz | H04L 63/08 726/6 |
| 2014/0280566 A1* | 9/2014 | Chen | H04L 67/306 709/204 |
| 2015/0007264 A1* | 1/2015 | Maldaner | H04L 67/1097 726/3 |

FOREIGN PATENT DOCUMENTS

| | | |
|---|---|---|
| JP | 2008-204178 | 9/2008 |
| JP | 2013-054623 | 3/2013 |

* cited by examiner

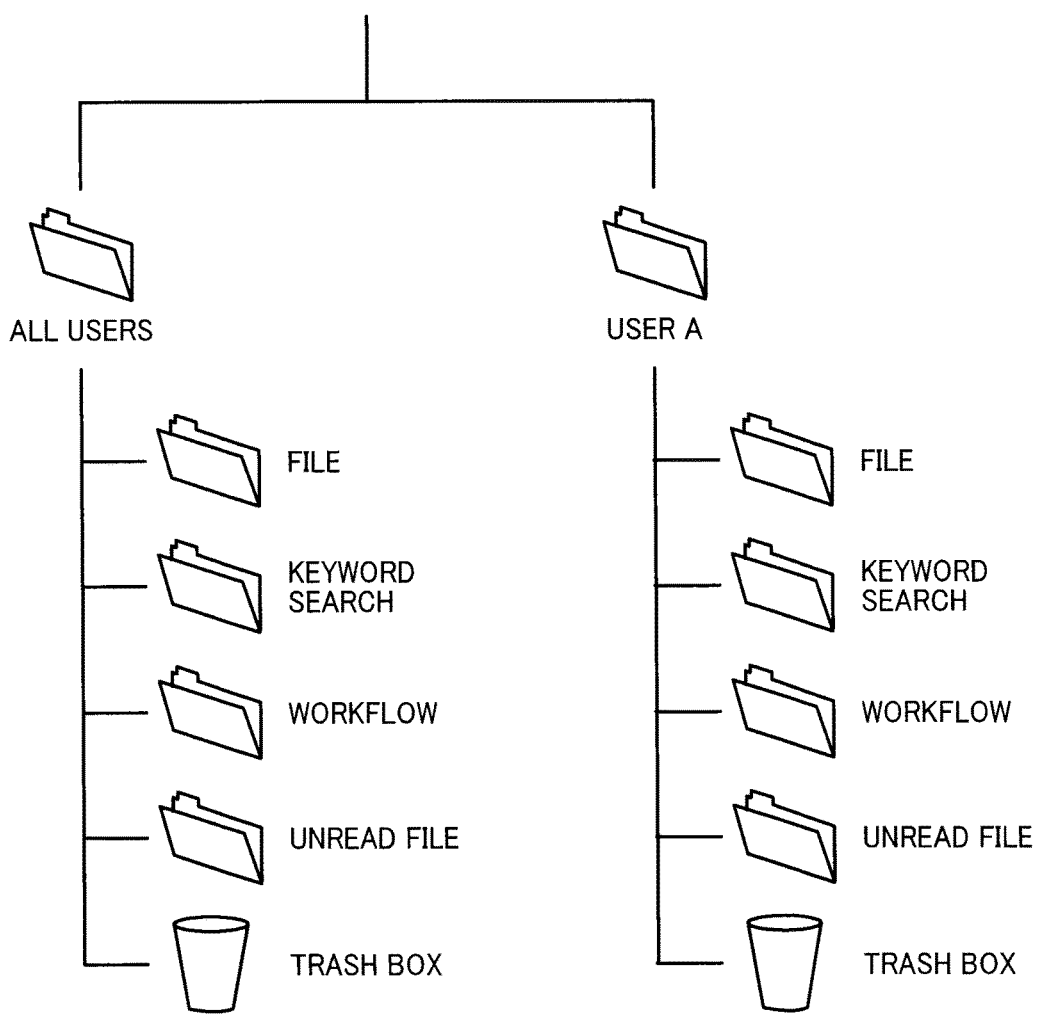

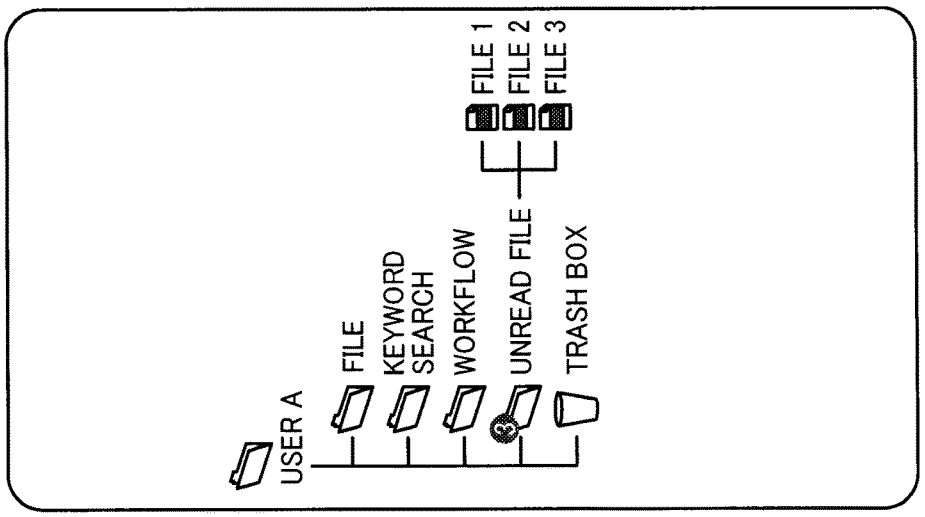
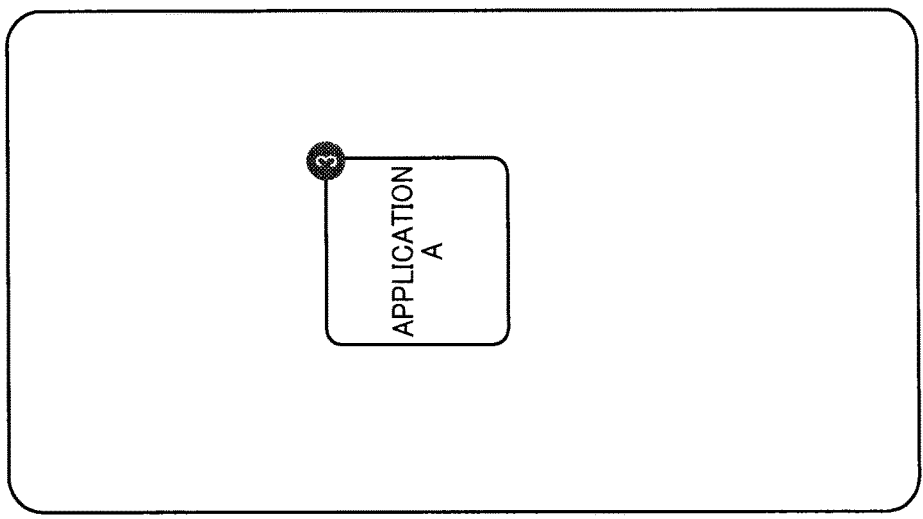
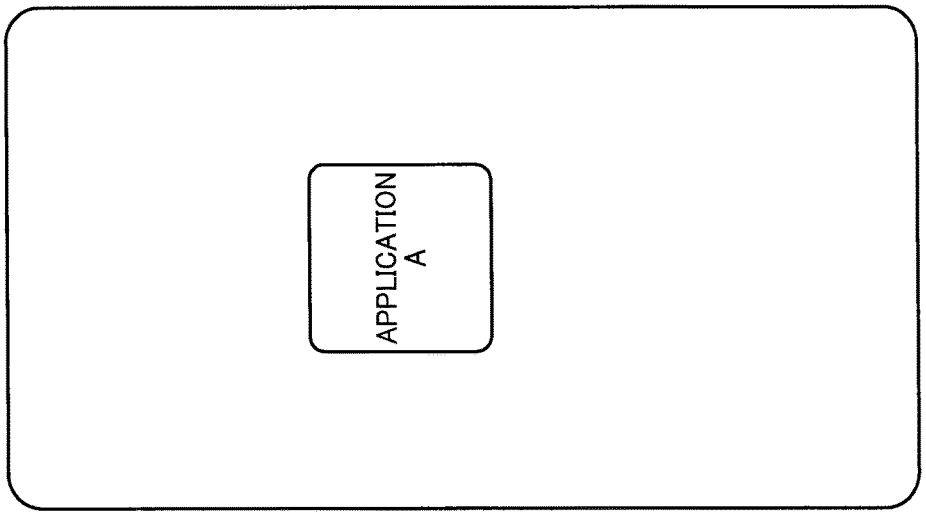

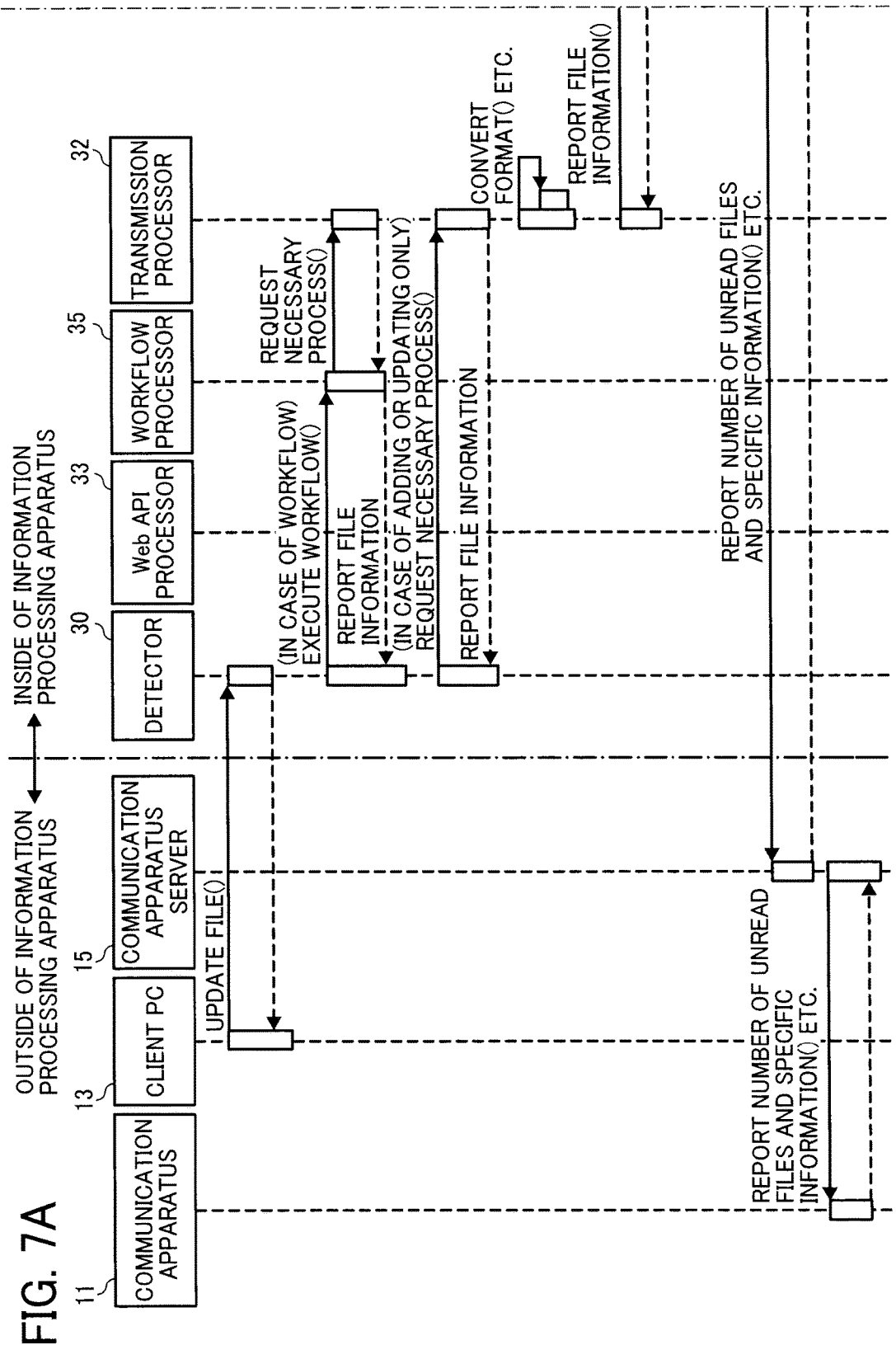

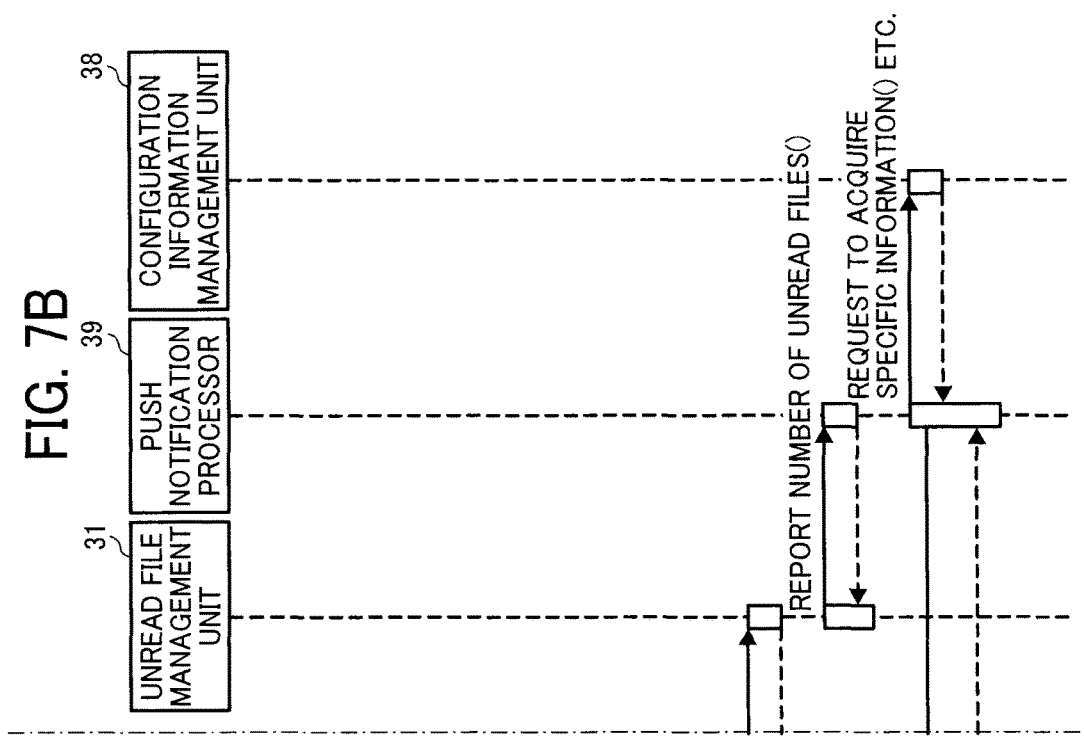

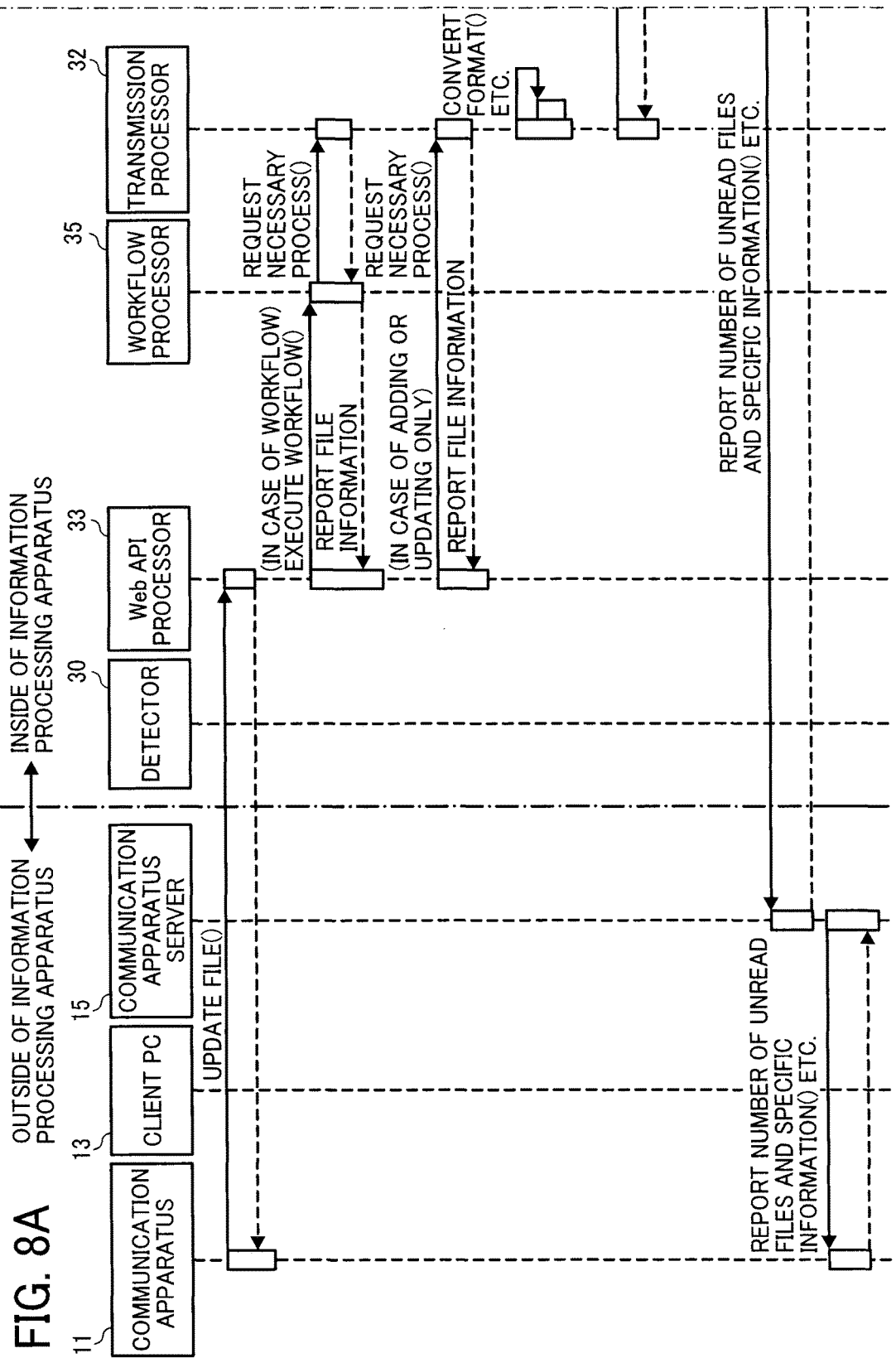

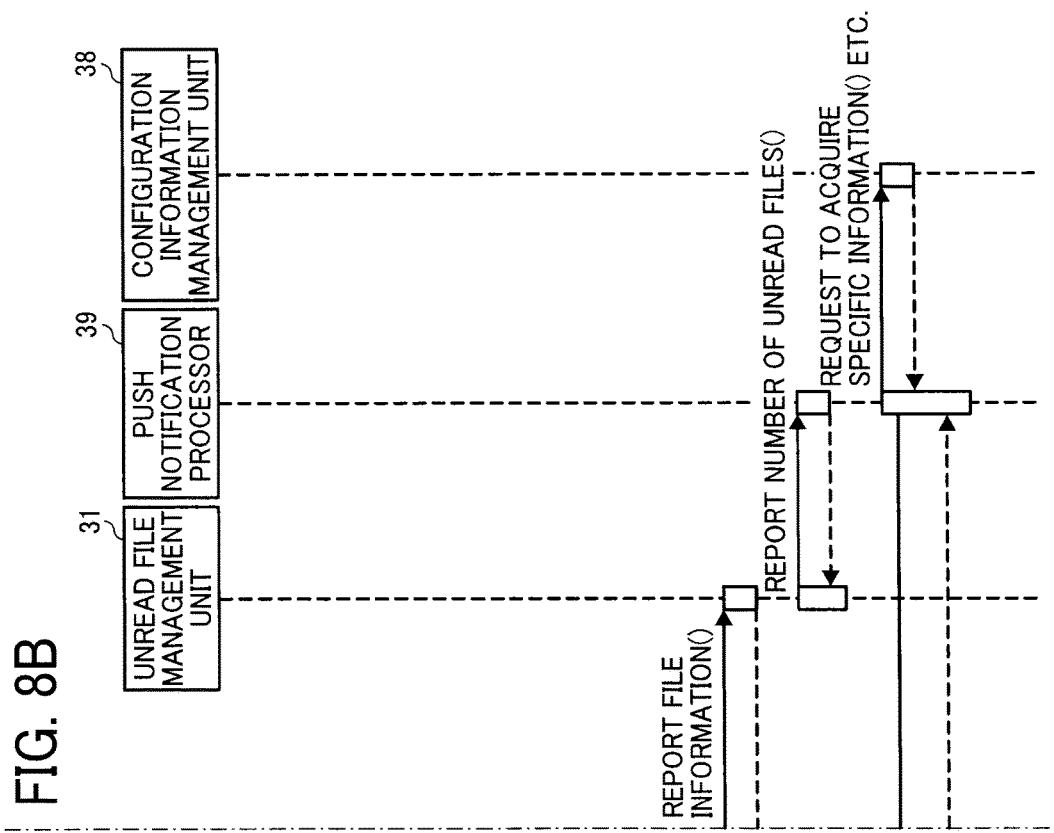

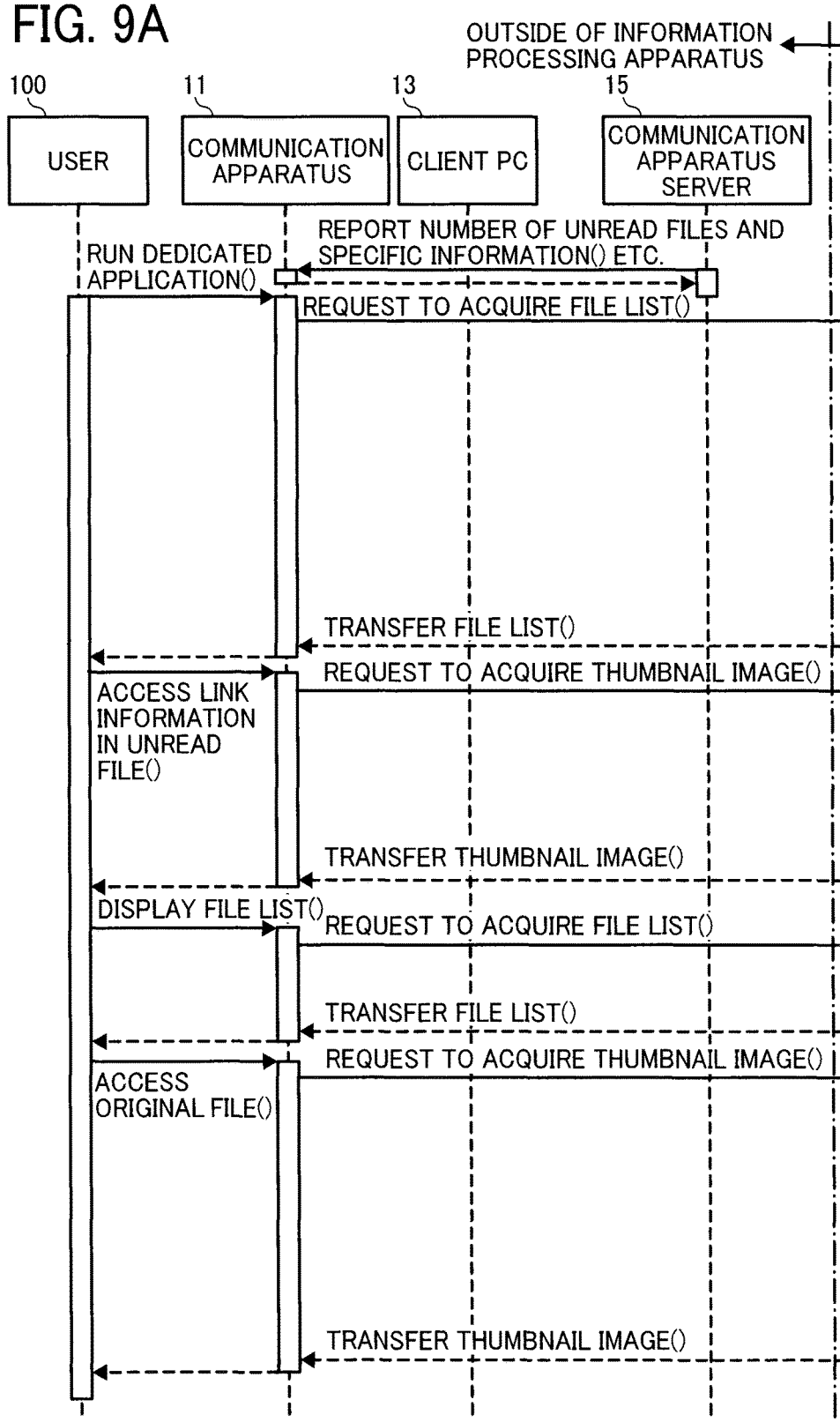

SELECT FILE →

INSTRUCT TO UPLOAD →

INSTRUCT TO CONVERT →

SPECIFY DESTINATION FOR DISTRIBUTION → UPLOAD

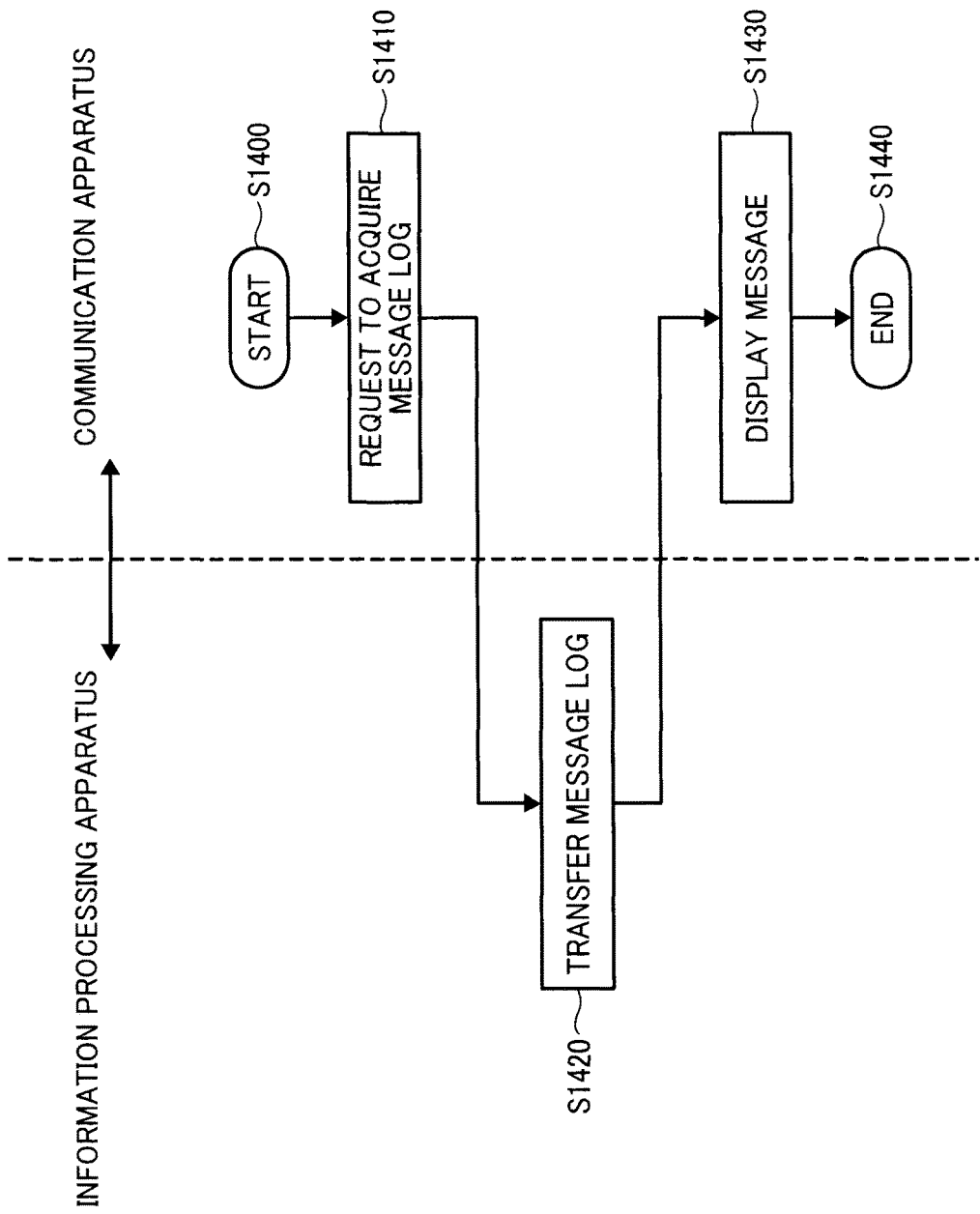

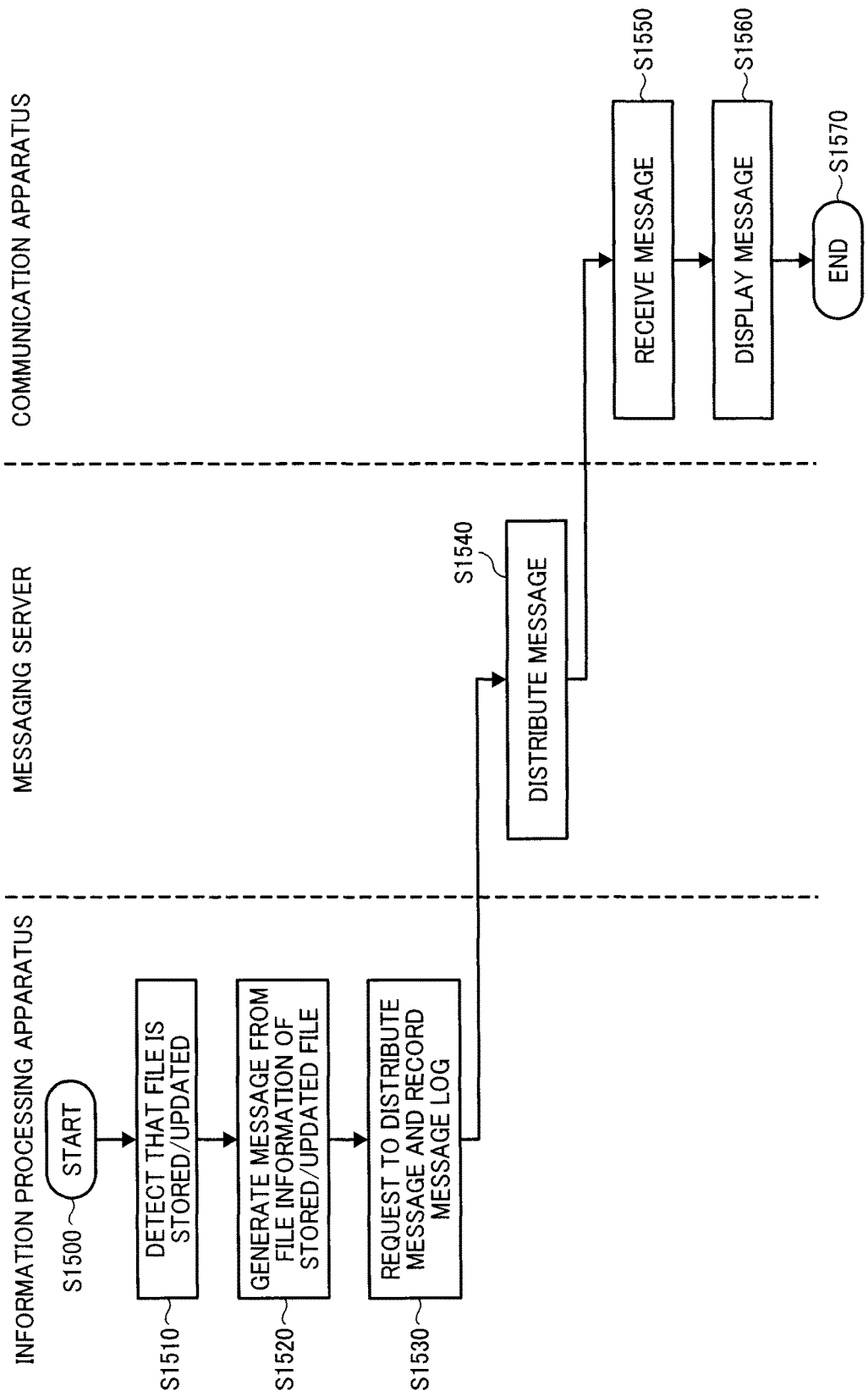

| ITEM | VALUE |
|---|---|
| CONTENT OF NOTICE | FAX RECEIVED. |
| FILE PATH | xxx/xxx/xxx.pdf |
| FILE UPDATED | January 1, 20XX 12:00:00 |
| FILE SIZE | 123KB |
| FILE THUMBNAIL | (THUMBNAIL IMAGE OF PAGE 1) |

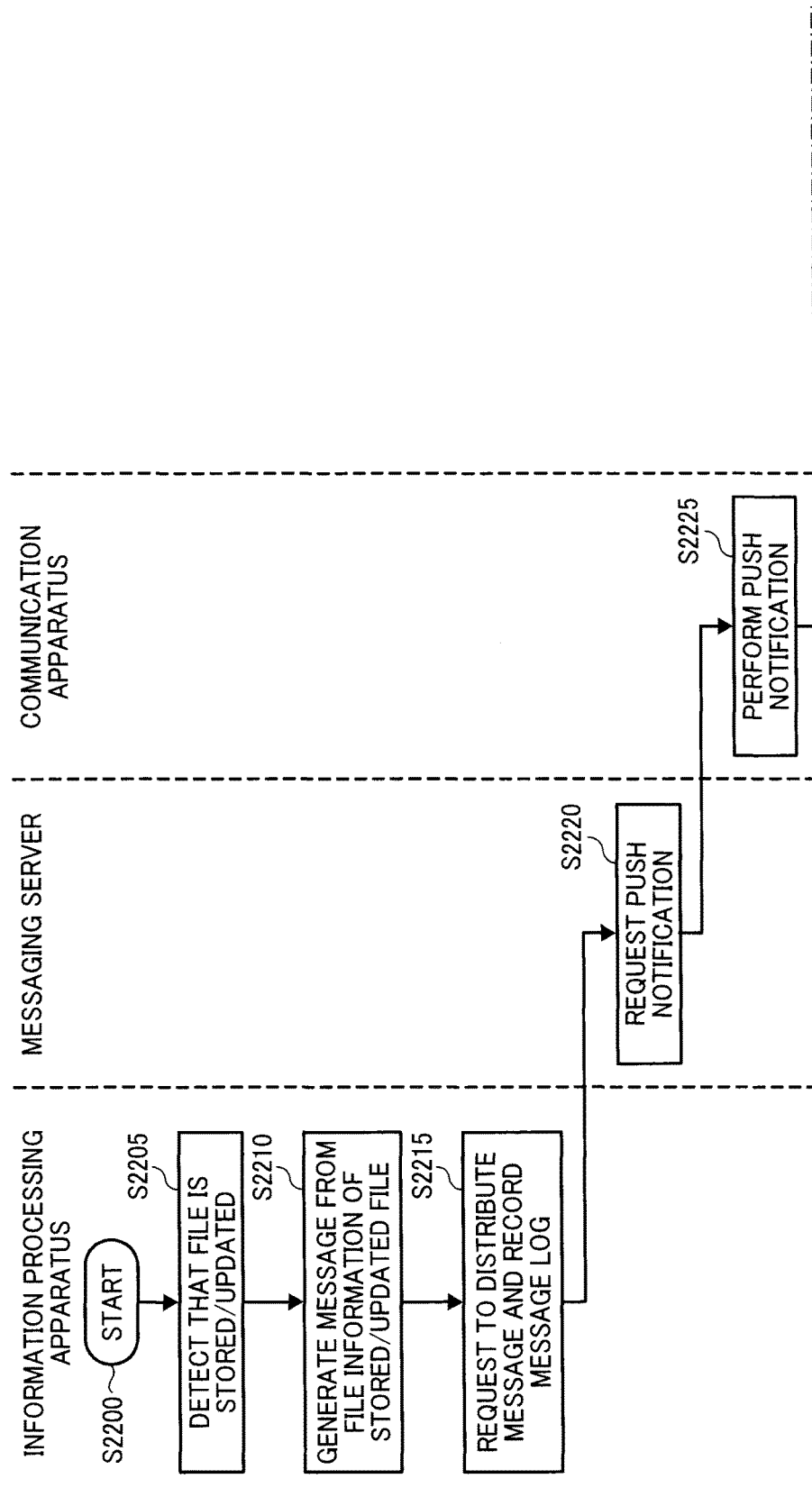

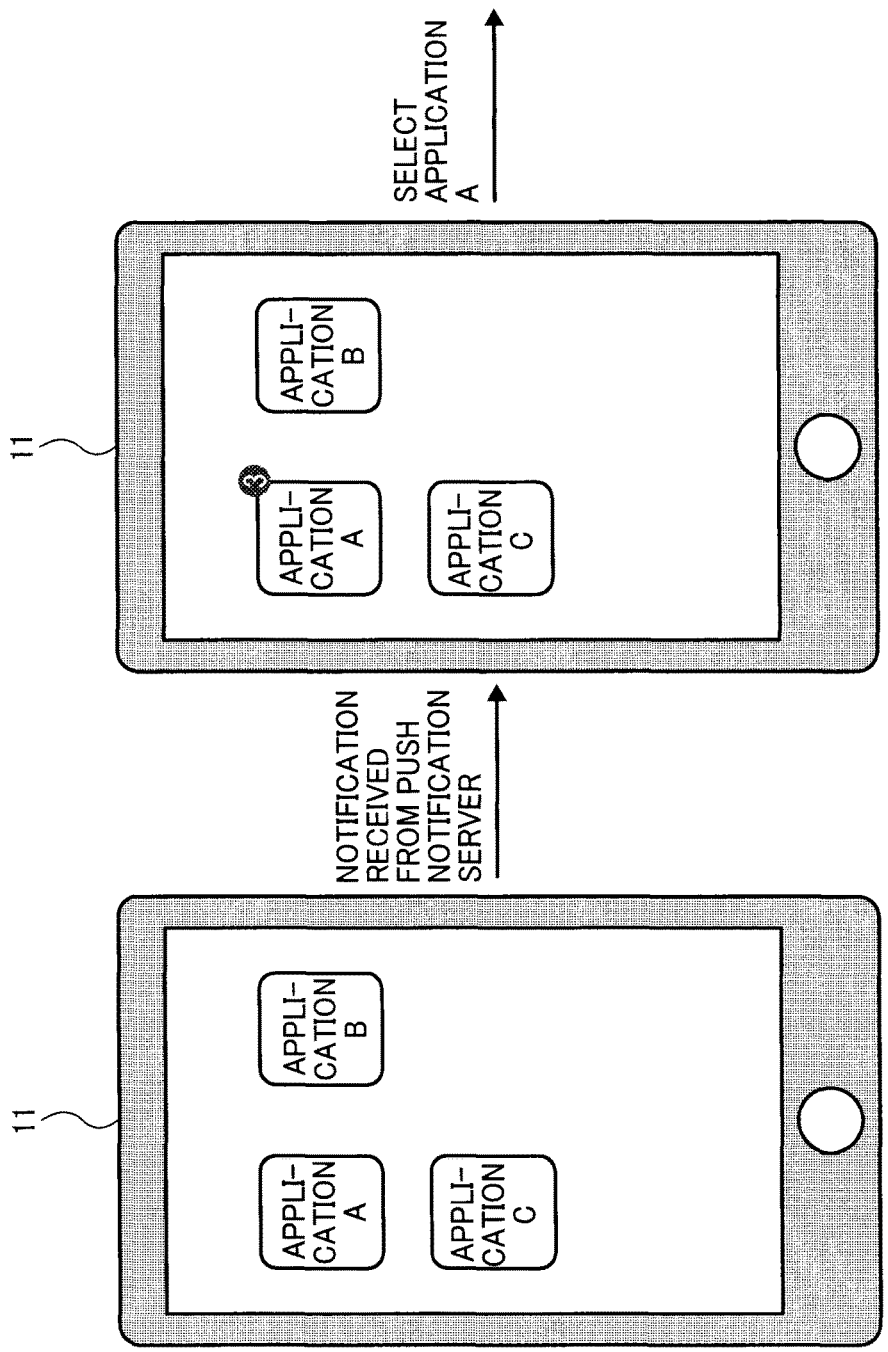

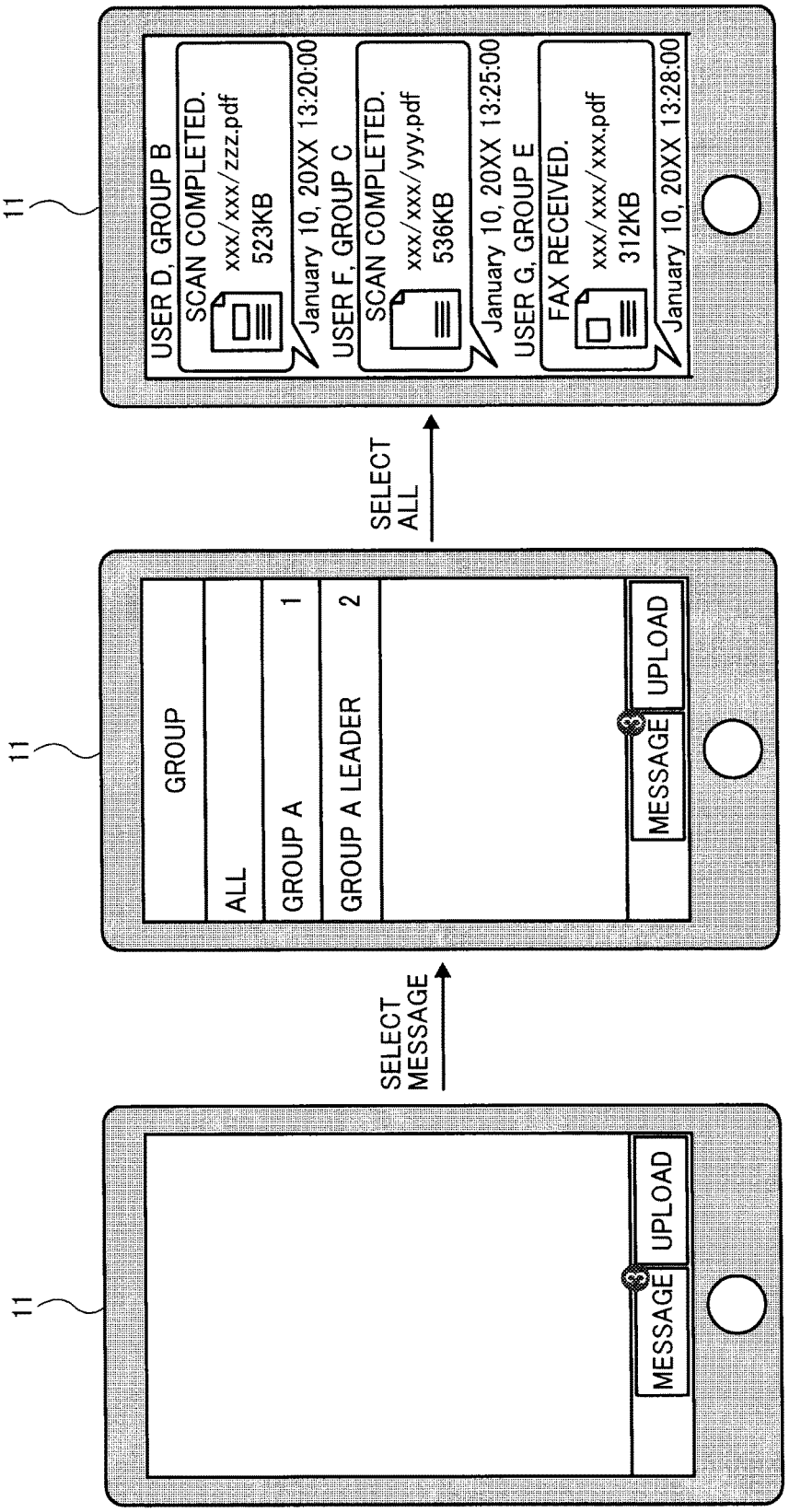

GENERATING LINK INFORMATION TO ACCESS A FILE STORED IN A STORAGE AREA ASSOCIATED WITH USER IDENTIFICATION INFORMATION

CROSS-REFERENCE TO RELATED APPLICATION

This patent application is based on and claims priority pursuant to 35 U.S.C. §119 to Japanese Patent Applications No. 2013-191847, filed on Sep. 17, 2013, and No. 2014-141126, filed on Jul. 9, 2014 in the Japan Patent Office, the entire disclosures of which are hereby incorporated by reference herein.

BACKGROUND

Technical Field

The present invention relates to an information processing apparatus, an information processing system, and a non-transitory recording medium storing an information processing program.

Background Art

With the development and popularization of network technology, enhancement of processing speed of apparatuses, and increased resolution of displays, etc., the amount of information exchanged via networks has been increasing. If all such information is stored on any given apparatus, a shortage of storage capacity may occur. In order to expand storage capacity, external Hard Disk Drives (HDDs) are widely used. In addition, Network Attached Storages (NASs) that can be handled easily and usefully without expertise and which are used for expanding storage capacity via networks have come to be widely used.

In case of storing files in a specific area of the apparatus, some NASs perform specific processes in accordance with the stored file type. Examples of such functions are file format conversion, workflow execution, and browsing. In file format conversion, for example, bmp files are converted into jpeg files. In workflow execution, predetermined processes such as attaching a file to an email and sending the email are executed.

In browsing, in cooperation with communication apparatuses such as smartphones, a folder tree of the NAS and files stored in the NAS are displayed on the communication apparatus. For example, after receiving a request to acquire a document file list from the smartphone, HTML data for displaying a document list screen is generated and sent to the smartphone, and the document list screen is displayed on the smartphone based on the HTML data.

SUMMARY

An information processing apparatus includes a memory that includes a first storage area associated with user identification information and a second storage area associated with the user identification information that is associated with the first storage area and a processor that stores a file in the first storage area in response to a request for adding the file to the first storage area, generates link information to access the file stored in the first storage area, in the second storage area that is associated with the user identification information associated with the first storage area, requests a notification server that transmits a notification that indicates that the file has been added to the first storage area, with identification information that identifies a communication apparatus that corresponds to the user identification information associated with the first storage area, and transfers, in response to a request from the communication apparatus that receives the notification, the link information stored in the second storage area associated with the user identification information corresponding to the communication apparatus and that further transfers, in response to access of the file by the communication apparatus using the link information, the file obtained from the first area to the communication apparatus.

Further example embodiments of the present invention provide an information processing system, an information processing method, and a non-transitory recording medium storing an information processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 5 is a diagram illustrating a list of files that a communication apparatus acquires as an embodiment of the present invention.

FIGS. 6A, 6B, and 6C are diagrams illustrating a screen displayed on the communication apparatus in case of updating a file as an embodiment of the present invention.

FIGS. 7A and 7B are sequence diagrams illustrating a process that reports the number of unread files to the communication apparatus and instructs the communication apparatus to display the number of unread files if a client PC adds or updates a file as an embodiment of the present invention.

FIGS. 8A and 8B are sequence diagrams illustrating a process that reports the number of unread files to the communication apparatus and instructs the communication apparatus to display the number of unread files if the communication apparatus adds or updates a file as an embodiment of the present invention.

FIGS. 9A, 9B, and 9C are sequence diagrams illustrating processes performed after instructing the communication apparatus to display the number of unread files as an embodiment of the present invention.

FIG. 14 is a flowchart illustrating a process performed between the information processing apparatus and the communication apparatus in FIG. 11.

FIG. 15 is a flowchart illustrating a process performed among the information processing apparatus, the communication apparatus, and a messaging server in FIG. 11.

FIGS. 22A and 22B are flowcharts illustrating a process performed among the information processing apparatus, the communication apparatus, the messaging server, and a push notification server in FIG. 21.

FIGS. 23A, 23B, 23C, 23D, and 23E are diagrams illustrating a process of displaying a message on the communication apparatus.

DETAILED DESCRIPTION

Figure 1:
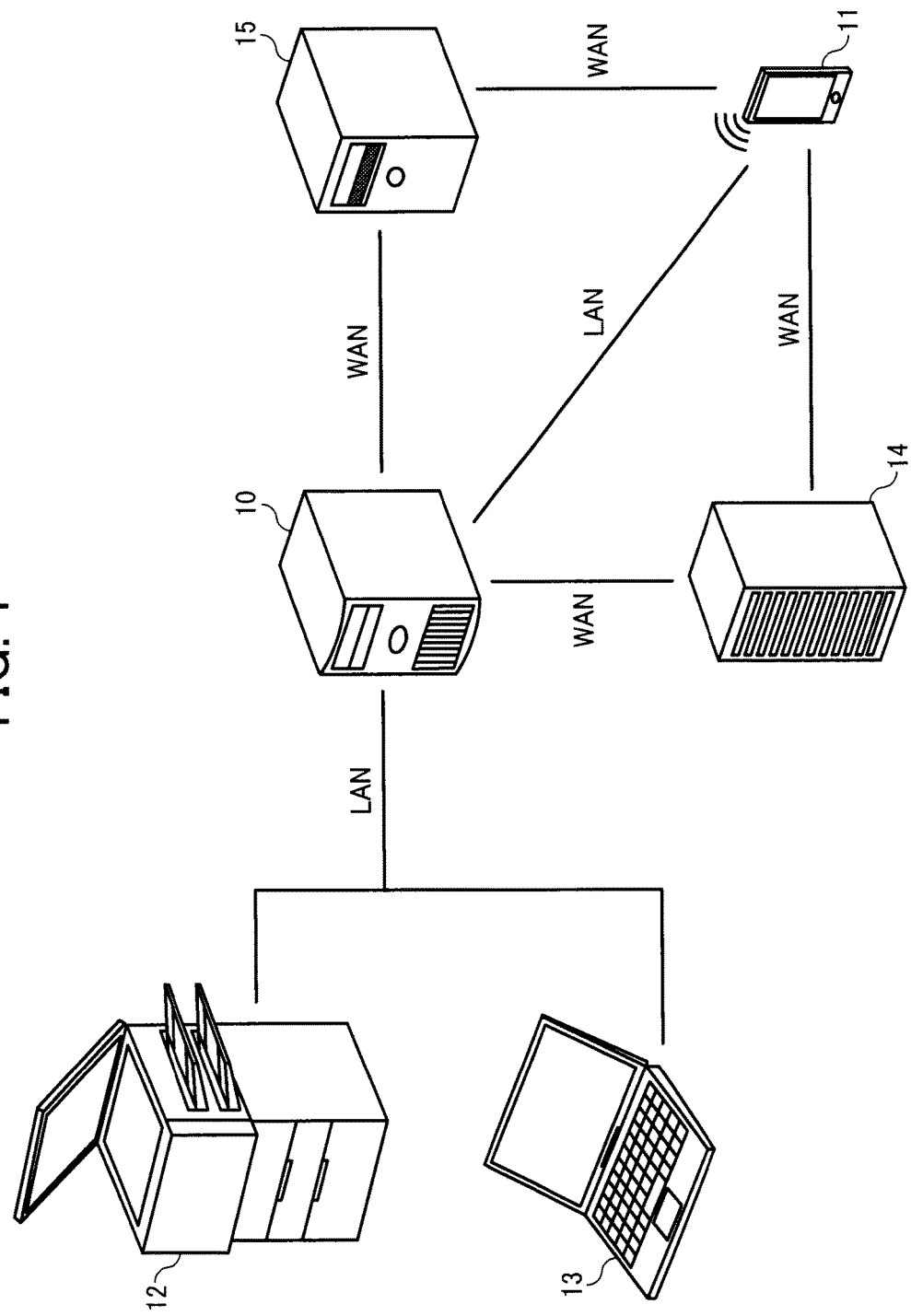
FIG. 1 is a diagram illustrating a configuration of an information processing system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

FIG. 1 is a diagram illustrating a configuration of an information processing system in this embodiment. The information processing system consists of at least a dedicated application implemented in the information processing apparatus 10, etc., and a communication apparatus 11 that can communicate with the information processing apparatus 10. In FIG. 1, the dedicated application is implemented in the information processing apparatus 10. While the information processing system can consist of the information processing apparatus 10 and the communication apparatus 11 alone, the information processing system can also include at least any one of a multifunctional peripheral (MFP) 12, a client Personal Computer (PC) 13, a relay server 14, and a communication apparatus server 15 shown in FIG. 1. In addition, the information processing system can include not only one information processing apparatus 10, communication apparatus 11, and MFP 12 each but also more than two information processing apparatuses 10, communication apparatuses 11, and MFPs 12. Furthermore, the information processing system can include other apparatuses.

The information processing apparatus 10 is connected to the MFP 12 and the client PC 13 via a local network such as Local Area Network (LAN), and the information processing apparatus 10 can similarly be connected to the communication apparatus 11 via the LAN. The information processing apparatus 10 is connected to the relay server 14 and the communication apparatus server 15 that relay communication with the communication apparatus 11 via a global network such as Wide Area Network (WAN). The communication apparatus 11 is connected to the relay server 14 and the communication apparatus server 15 via the Internet or a WAN such as 3G channel or Long Term Evolution (LTE). All of WAN can be the same Internet, or each part of WAN can be different network.

Generally speaking, in order to limit access from other networks, a communication limiter such as a firewall is introduced to the LAN. By contrast, WAN can be accessed from other networks freely. Each apparatus can be connected to the network wired or wirelessly. In case of connecting wirelessly, the apparatus can be connected via a base station access point.

The information processing apparatus 10 may be a PC or a workstation etc. The information processing apparatus 10 implements a generic Operating System (OS) such as Windows or UNIX and communicates with the MFP 12 etc. via the LAN and WAN. The information processing apparatus 10 implements a dedicated application and receives a request to the information processing apparatus 10 from the MFP 12 etc. using a generic communication protocol such as Hypertext Transfer Protocol (HTTP). Subsequently, the information processing apparatus 10 processes the received request by the dedicated application and transmits the process result to the MFP 12 etc. via the network.

The communication apparatus 11 may be a smartphone, Personal Digital Assistant (PDA), and tablet device etc. The communication apparatus 11 implements a generic OS for communication apparatuses and communicates with the information processing apparatus 10 etc. via the network. The communication apparatus 11 also implements a dedicated application, exchanges information with the information processing apparatus 10 using the generic communication protocol such as HTTP etc., acquires and displays a list of files managed by the information processing apparatus 10. The dedicated application implemented in the communication apparatus 11 can configure the information processing apparatus 10. In this regard, in case of configuring the information processing apparatus 10 from the communication apparatus 11, assuming that user authorization is given, only settings that consider the user authorization can be configured.

Examples for configuration information configured to the setting items are user information used for login etc., information on managed files, and system configuration information of the information processing apparatus 10. Examples of the user information are a user name, user ID, password, authorization, workflow settings, and various setting values on a Web UI screen etc. Examples of file information are a file name, file path, created date/time, updated date/time, user name who created the file, and file type etc. Examples of system configuration information are Media Access Control (MAC) address, information specific to the apparatus such as a serial number, and settings common to all users etc. In this regard, the file path is a string that indicates an area where the file is located.

The MFP 12 is an apparatus that implements multiple functions. Examples of those functions are printing function, facsimile transferring/receiving function, scanning function, and mail transferring/receiving function etc. The MFP 12 implements software so-called browser software for browsing information on the networks, and the MFP 12 accesses to the information processing apparatus 10 via the browser software. By using the browser software, the MFP 12 transmits a request to the information processing apparatus 10 using the generic communication protocol such as HTTP etc. The MFP 12 implements a file system as a function that the OS includes for operating computer resources. Therefore, if it is possible to perform Server Message Block (SMB) access to the information processing apparatus 10, it is possible to copy a file stored in the MFP 12 to a shared folder in the information processing apparatus 10. Furthermore, since it is possible to access files stored in the shared folder in the information processing apparatus 10, it is possible to update files via the networks.

Here, SMB is a protocol for sharing files and printers via the networks, and SMB access is communication using that protocol.

The client PC 13 can be any one of a note PC, a desktop PC, and a tablet PC. The client PC 13 implements a generic OS and is connected to the MFP 12 etc. via the networks. Just like the MFP 12, the client PC 13 also implements a file system and can perform SMB access to the information processing apparatus 10. Therefore, it is possible to copy files stored in the client PC 13 to the shared folder in the information processing apparatus 10, and it is also possible to access files stored in the shared folder in the information processing apparatus 10. Consequently, the client PC 13 can also update files via the networks.

The relay server 14 relays communication between the information processing apparatus 10 and the communication apparatus 11. If the communication apparatus 11 cannot communicate with the information processing apparatus 10 via the LAN due to the communication limiter such as the firewall etc., the communication apparatus 11 communicates with the information processing apparatus 10 via the WAN and the relay server 14. If the communication apparatus 11 transmits a request to the relay server 14, the relay server 14 receives the request and stores it in a queue included in the relay server 14. The information processing apparatus 10 performs an inquiry on whether or not the relay server 14 has the request to the information processing apparatus 10 (poling) on regular basis. In response to the inquiry, if the relay server 14 has the request, the relay server 14 picks up the request stored in the queue sequentially and transmits it to the information processing apparatus 10. Consequently, the request from the communication apparatus 11 can be transmitted to the information processing apparatus 10.

This mechanism is described in detail below. The communication apparatus 11 transmits the request that includes identification information to identify the information processing apparatus 10 (e.g., contact ID) to the relay server 14. The contact ID is an identifier that can identify the specific information processing apparatus 10, and the contact can be any a combination of characters, numbers, and symbols etc. The relay server 14 registers an apparatus using the contact ID described above preliminarily and allocates a dedicated queue for the apparatus. Therefore, the relay server 14 refers to the contact ID included in the request and put the request to the queue that the contact ID is allocated. The information processing apparatus 10 transmits the contact ID of the information processing apparatus 10 along with performing poling. After referring to the contact ID received from the information processing apparatus 10, the relay server 14 searches for the queue that corresponds to the contact ID. If requests are stored in the queue, the relay server 14 transmits the stored requests to the information processing apparatus 10 sequentially. In case of replying a processing result from the information processing apparatus 10 to the communication apparatus 11, the similar process is performed using the contact ID of the communication apparatus 11, and the processing result can be replied.

Just like the relay server 14, the communication apparatus server 15 also relays communication. The communication apparatus server 15 manages a generic OS implemented in the communication apparatus 11 and sends a command to the OS implemented in the communication apparatus 11. This command is transferred to the communication apparatus 11 from the information processing apparatus 10 via the communication apparatus server 15. It should be noted that it is unnecessary to set up the communication apparatus server 15 if the information processing apparatus 10 can transfer the command to the communication apparatus 11 directly. An example of the command is the number of unread files reported to the communication apparatus 11 in case of updating files in the information processing apparatus 10. The number of unread files is reported along with specific information that can identify the communication apparatus 11 and the dedicated application implemented in the communication apparatus 11, and the specific information is used when the communication apparatus server 15 specifies the origin etc.

In this case, the specific information is used. However, for example, two types or pieces of information, terminal identification information to identify the communication apparatus 11 and application identification information to identify the dedicated application, can be reported to identify the communication apparatus 11 and the dedicated application separately.

The number of unread files is displayed associated with an entity (e.g., an icon) that indicates the dedicated application that the communication apparatus 11 specifies using the specific information. Known technologies can be used for the association. By browsing the number of unread files displayed on the communication apparatus 11, it is possible to know that there are added/updated files in the file list displayed by the dedicated application.

After starting the dedicated application, the communication apparatus 11 requests the information processing apparatus 10 to acquire the file list. Subsequently, the information processing apparatus 10 generates a file list that indicates which file has been added/updated distinguishable from other files and replies. The file list is generated as display information for displaying file information of added/updated files on the communication apparatus 11. Consequently, on the communication apparatus 11, the added/updated files are displayed distinctively from other files, and it is easy to find and check the added/updated files. As a result, user convenience can be improved. The information processing apparatus 10 can generate a file list for added/updated files only and send it back. In this case, it is possible to ascertain which files have been added or updated at a glance.

Figure 2:
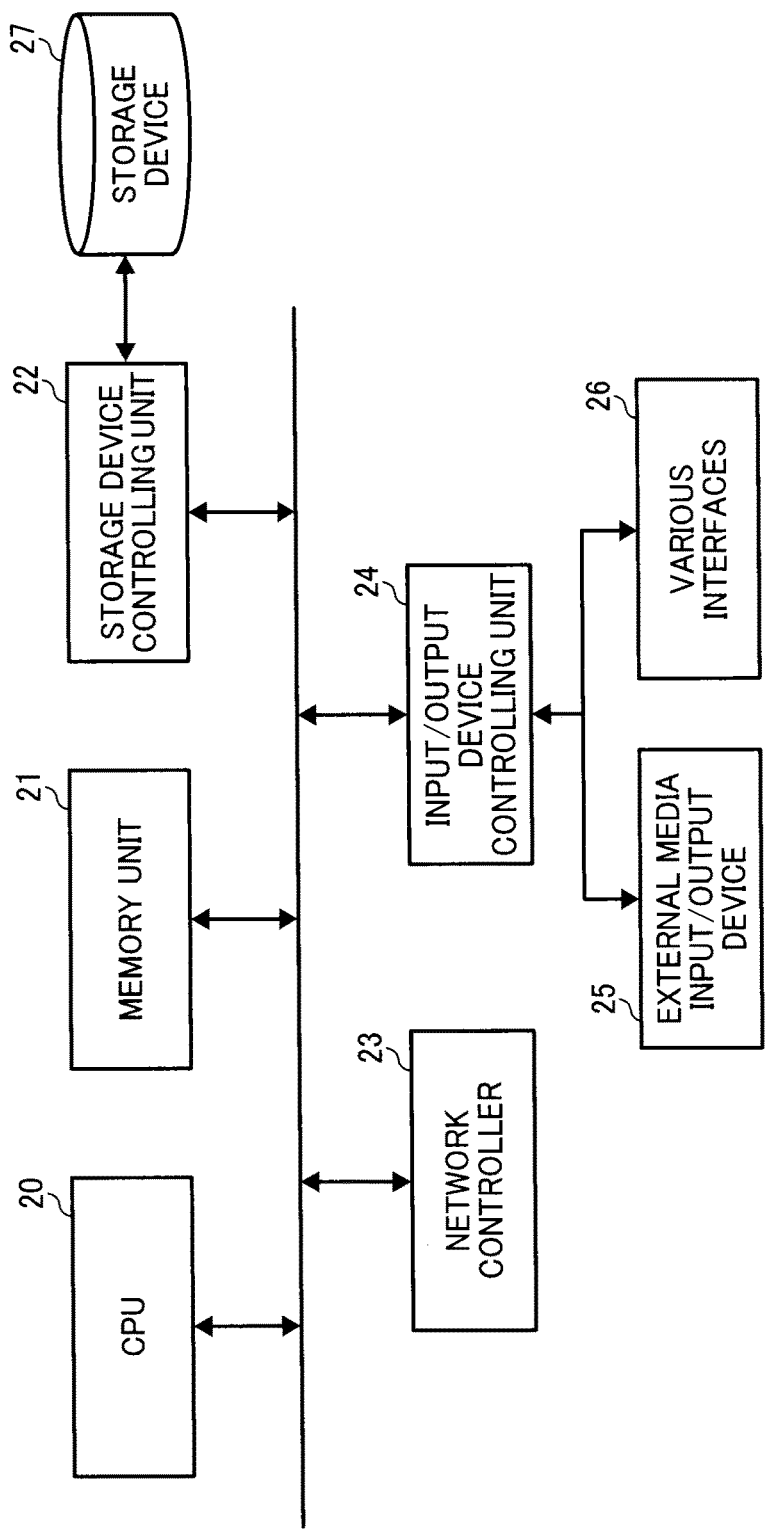
FIG. 2 is a diagram illustrating a hardware configuration of an information processing apparatus as an embodiment of the present invention.

A specific apparatus configuration and processing content for implementing the above embodiment is described below in detail. FIG. 2 is a diagram illustrating a hardware configuration of the information processing apparatus 10 included in the information processing system. The hardware configuration of the information processing apparatus 10 is similar to generic PCs, and the information processing apparatus 10 includes a CPU 20, a memory unit 21, a storage device controlling unit 22, a network controller 23, an input/output apparatus controlling unit 24, an external media input/output device 25, and various interfaces 26. In addition, the information processing apparatus 10 includes a storage device 27 such as a Hard Disk Drive (HDD).

The CPU 20 controls units included in the information processing apparatus 10, calculates data, and processes data. The CPU 20 executes programs such as the dedicated application stored in the memory unit 21, receives data from an input device (not shown in figures) and the storage device 27 etc., calculates and processes the data, and outputs the result to those units. The memory unit 21 stores the OS that the CPU 20 executes, programs such as the dedicated applications etc., and data temporarily or over the long term.

The storage device 27 stores various information that the information processing apparatus 10 manages and data related to the programs such as the dedicated application etc. The storage device controlling unit 22 manages files stored in the storage device 27 using functions such as database and file system etc. The network controller 23 is an Ethernet controller for example, and the network controller 23 communicates with other apparatuses via the LAN and WAN. The input/output device controlling unit 24 manages the external media input/output device 25 and the various interfaces 26, and the input/output device controlling unit 24 inputs/outputs data from/to external apparatuses such as the MFP 12 and the client PC 13 shown in FIG. 1 etc. The external media input/output device 25 controls external media such as a Universal Serial Bus (USB) media, Compact Flash (CF) card, and Secure Digital (SD) card etc. and inputs/outputs data. The various interfaces 26 are interfaces to connect external devices such as a serial port, USB port, and IEEE 1394 etc. and it is possible to connect and use generic input/output devices.

While only the hardware configuration of the information processing apparatus 10 is described above, the communication apparatus 11, the MFP 12, the client PC 13, the relay server 14, and the communication apparatus server 15 can adopt the similar hardware configuration. It should be noted that the MFP 12 further includes a printing unit and a scanning unit etc. to implement a printing function and scanning function etc.

Figure 3:
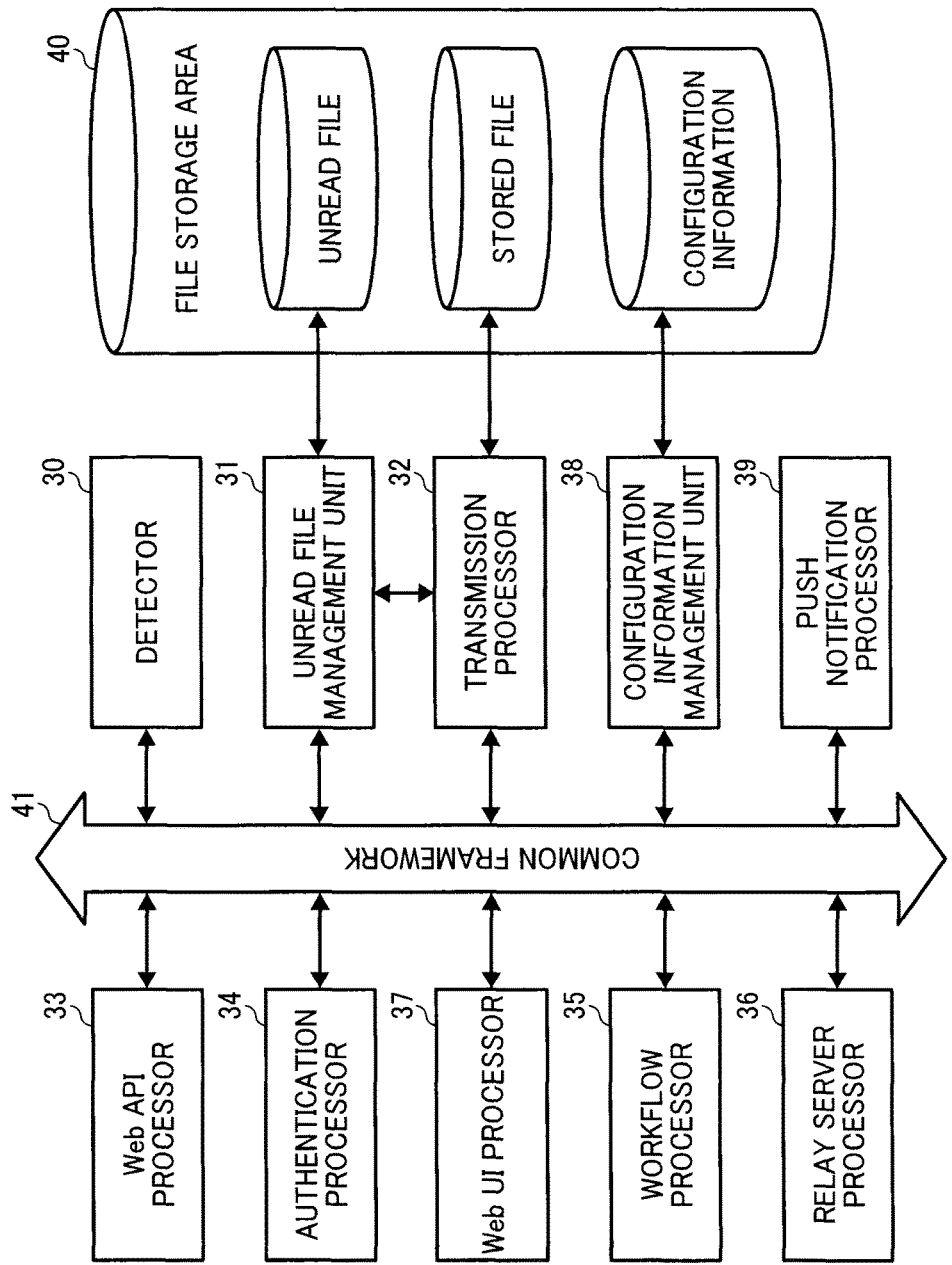
FIG. 3 is a block diagram illustrating functions of the information processing apparatus as an embodiment of the present invention.

FIG. 3 is a block diagram illustrating functions of the information processing apparatus 10 included in the information processing system. The information processing apparatus 10 manages one or more files stored in a file storing unit such as the storage device 27. After receiving the request from the communication apparatus 11, the information processing apparatus 10 outputs the list of managing files to the communication apparatus 11, and the information processing apparatus 10 instructs to display the file list on the communication apparatus 11. In order to ascertain newly added files and updated files visually in the file list displayed on the communication apparatus 11, the information processing apparatus 10 includes at least a detector 30, an unread file manager 31, and a transmission processor 32.

The information processing apparatus 10 can further include a Web API processor 33, an authentication processor 34, a workflow processor 35, a relay server processor 36, a Web UI processor 37, a configuration information manager 38, and a PUSH notification processor 39 as a notifying unit. In FIG. 3, the information processing apparatus 10 includes a file storage area 40 as a storage area where files are stored. However, the file storage area can exist outside of the information processing apparatus 10 such as an external HDD. It is not necessary that the information processing apparatus 10 include all of the Web API processor 33, the authentication processor 34, the workflow processor 35, the relay server processor 36, the Web UI processor 37, the configuration information manager 38, and the PUSH notification processor 39. These functional units such as the processing units and the managing units described above are implemented by executing the dedicated application by the CPU 20 and the units described above.

The information processing apparatus 10 includes a common framework 41, and multiple functional units implemented in the information processing apparatus 10 use the common framework 41 to communicate with each other. Requests and files exchanged between the functional units are transmitted via the common framework 41. The Web API processor 33 controls requests sent from the communication apparatus 11, the MFP 12, and the client PC 13 connected to the network, serializes the received requests by each request origin, and transfers it to each of the processing units via the common framework 41.

The Web UI processor 37 controls a screen displayed by an application so-called Web server implemented in the information processing apparatus 10. The Web UI processor 37 creates the screen in accordance with the configuration information and the file content per user. The authentication processor 34 performs user authentication in case of logging in by inputting information via the Web UI processor 37 and the Web API processor 33. The authentication processor 34 acquires user information from configuration information managed by the configuration information manager 38 (described later) and determines whether or not it corresponds with the user information input by the user. In case of corresponding, the authentication succeeds. Otherwise, the authentication fails. In case of failing the authentication, the authentication processor 34 sends back authentication error via the Web UI processor 37b and the Web API processor 33.

The transmission processor 32 manages one or more files stored in the file storage area 40 included in the information processing apparatus 10. Examples of the files stored in the file storage area 40 are files saved by SMB access and files created by the application implemented in the information processing apparatus 10. The transmission processor 32 not only manages files but also converts data format. An example of the format conversion is converting image format such as converting a bmp file into jpeg file. The converted files are also stored in the file storage area 40, and they are managed by the transmission processor 32.

The transmission processor 32 generates the file list based on the information on unread files reported by the unread file manager 31 (described later) and transfers the generated file list to the communication apparatus 11. In the file list, one or more managed files are listed so that the unread files can be distinguished from other files. The file list can be either a list that lists files on a line or a list indicated by a tree structure using folders. The transmission processor 32 can transfer a list of added/updated files only to the communication apparatus 11. Here, the list of all files is transferred. In addition, file modification indicates file update.

The detector 30 detects that a file (a new file) is added in the file storage area 40 and a file stored in the file storage area 40 has been updated. Specifically, the detector 30 detects that the new file has been saved and the existing file has been updated and overwritten. The detector 30 always monitors the file storage area 40, and the detector 30 can also detect that the existing file has been deleted. One or more files stored in the file storage area 40 are managed by the file system, and the file system modifies management information if the file to be managed is modified such as adding a new file. As a result, by referring to the management information, the detector 30 can detect that files are added/updated and acquire the file information.

The detector 30 reports the detecting result including the file information to the transmission processor 32. By receiving the information on modified files, the transmission processor 32 can manage the files stored in the file storage area 40 in synchronization with the file system.

The unread file manager 31 receives the detecting result from the detector 30 via the transmission processor 32, acquires the information on the added/updated files, and manages those files as unread files. Subsequently, the unread file manager 31 reports the information of managing unread files to the transmission processor 32. The unread file manager 31 generates link information for referring to a file such as a link and shortcut for unread files that hard-links to an actual file path, associates the file with the link information, and handles them just like existing files. If only the information processing apparatus 10 can access the link information and conditions (described later) are not satisfied, the unread file manager 31 stores in a private storage area that other apparatuses cannot browse in the file storage area 40. The file storage area 40 includes the private storage area and a public storage area that can access the existing files, and these storage areas are managed by the transmission processor 32.

Here, the unread files are managed by user information. By managing the unread files by user information (i.e., by user), for example, even if user B accesses the file A before user A accesses file A, it is possible to manage that user A has not read file A yet. As a result, the information processing apparatus 10 can report that file A is unread until user A browses file A.

The workflow processor 35 performs predetermined workflow if the detector 30 detects that the file has been added and the added file has been stored in a predefined folder. Examples of the workflow are converting file format, transferring a file to a specified path, and sending a file to a specified destination attached to e-mail etc. The transmission processor 32 performs the file modification processes such as converting file format.

The relay server processor 36 monitors the relay server 14 shown in FIG. 1 on regular basis and checks whether or not there is the request to the information processing apparatus 10 in the relay server 14. The relay server processor 36 performs poling regularly, acquires the requests stored in the relay server 14, transfers the requests to each of the processing units, instructs the processing unit to process the request, and reports the processing result to the relay server 14.

The configuration information manager 38 manages configuration information stored in the file storage area 40. The configuration information includes the user information described above and system configuration information. Depending on user authority, the configuration information is considered either as read only or as modifiable. In configuration items to set the configuration information, there is a configuration on whether or not the added/updated file is added as the unread file. By disabling this configuration, it is possible to handle the added/updated file not as unread file. As a result, it is impossible to display which file has been added or updated. In addition, in the configuration information, user information as report destination configured for each folder is managed.

It is possible to configure whether or not the file is added as the unread file on a display screen that the Web UI processor 37 displays or a display screen that the dedicated application implemented in the communication apparatus 11 displays. This configuration is stored as the configuration for each user. Here, in order to handle the file as the unread file and ascertain which file has been added or updated, this configuration is enabled.

The configuration information manager 38 also manages specific information that can identify the specific communication apparatus 11 and the dedicated application implemented in the communication apparatus 11 and the OS type implemented in the communication apparatus 11 etc. This information is managed associated with each other. The specific information can be any combination of characters, numbers, and symbols as far as it can identify both the communication apparatus 11 and the dedicated application. Examples of the OS type are Android OS and iOS etc. In addition, the configuration information manager 38 manages the user information associated with the specific information of the communication apparatus 11. Consequently, in case of adding a file to a folder, the information processing apparatus 10 can refer to the user information associated with the folder and reports to the communication apparatus 11 specified by the specific information associated with the referred user information. For example, by storing the specific information of the communication apparatus 11 that the user uses usually with the association, the user can receive the notification on the communication apparatus 11 that the user uses usually. It should be noted that the specific information of the multiple communication apparatus 11 can be associated with single user information.

Before the transmission processor 32 transfers the file list, the PUSH notification processor 39 report about the number of unread files as information on the added/updated files and instructs to display the number of unread files on an icon that indicates the dedicated application implemented in the communication apparatus 11. In reporting the number of unread files, the specific information and the information that indicates the OS type implemented in the communication apparatus 11.

When the information processing apparatus 10 reports the number of unread files to the communication apparatus 11, the information processing apparatus 10 transfers the information via the communication apparatus server 15 shown in FIG. 1. Therefore, in case of updating the number of unread files, the transmission processor 32 reports the communication apparatus server 15 about that immediately. The communication apparatus server 15 specifies the communication apparatus 11 based on the specific information and reports the number of unread files and the specific information to the specified communication apparatus 11. In this case, the communication apparatus server 15 changes its address depending on the OS type, and after establishing communication with the communication apparatus 11, the communication apparatus server 15 reports the number of unread files and the specific information forcibly. Consequently, in establishing communication, the communication apparatus 11 can display the number of unread files associated with the icon that indicates the dedicated application. As a result, the user can instantly ascertain that there is an added/updated file, for example, visually.

Figure 4:
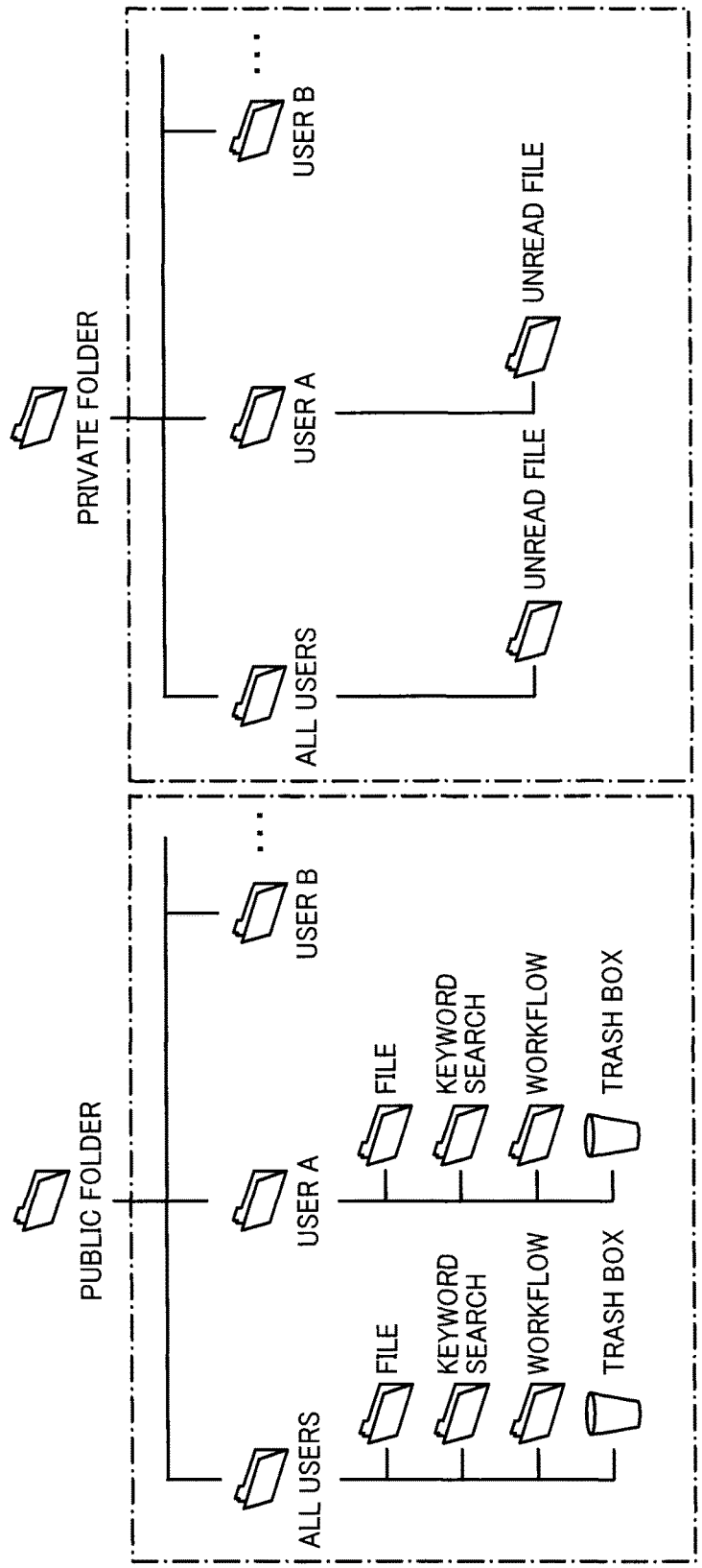
FIG. 4 is a diagram illustrating a list of files managed by the information processing apparatus as an embodiment of the present invention.

FIG. 4 is a diagram illustrating a list of files managed by the information processing apparatus 10. For example, those files are managed using a shared folder (public folder) that can be accessed using SMB and a private folder unopened to network as a private storage area. These folders include multiple folders and files, and the file list can be displayed in tree structure (directory structure). In case of displaying in tree structure, the public folder and the private folder are considered as root nodes, and nodes connected to the root nodes are considered as a "All Users folder" opened to all users and "User folders" opened to each of the users.

A file folder used for storing files normally and a keyword search folder that generates a link to a file stored in the information processing apparatus 10 by using the keyword as the folder name are connected to the public folders, the All Users folder and User folders. Similarly, a workflow folder that performs a preregistered process automatically after storing a file in the workflow folder and a trash folder that deletes unnecessary files temporarily are connected to the All Users folder and User folders as well.

The All Users folder opened to all users and User folders opened to each of the users are connected to the private folder too. Only an unread file folder can be connected to the All Users folder and User folders. Even if the information processing apparatus 10 receives the request for the folder list from another apparatus that is accessible and does not satisfy the condition, the private folder is not displayed on the folder list. By contrast, if the information processing apparatus 10 receives the request for the folder list from another apparatus that is accessible and satisfies the condition, the folder list that includes the private folders is displayed on the other apparatus. The other apparatus that is accessible from the dedicated application implemented in the information processing apparatus 10 and the private folders are displayed can access files in the private folders via the application in the information processing apparatus 10. These private folders are created for each of the users. Since the functional units showed in FIG. 3 are implemented by executing the dedicated application by the CPU 20, the functional units can access the private folders.

In the unread file folders, original files such as files saved by SMB access and created by the application implemented in the information processing apparatus 10 are not stored. However, link information for original files is stored in the unread file folders. Therefore, in the unread file folder, the link information generated when a file is added to the public folder newly, a file in the public folder is updated, and a file is generated from the added file newly is stored. The reason for storing not the original files but their link information is to save size of the file storage area 40 by not storing original files in the unread file folders. Based on the detection result detected by the detector 30, the unread file manager 31 generates the link information newly as long as corresponding link does not exist in the unread file folder. That is, if link information A for file A is already stored in the unread file folder, redundant link information is prevented from being stored by not string link information A again. The link information is information such as hard link and shortcut, etc., and can be used for referring to the file of link destination. Here, hard link is a mechanism that can be referenced by using another path.

The link information is associated with the original file and stored in the file storage area 40 as table information. As a result, both the original file and the link information are cross-referenced. That is, in case of accessing the original file, it is known that the link information exists, and the link information can be deleted from the unread file folder. The reason for deleting the link information in this case is that, if the original file is accessed once, that means that the user has already checked the newly added/updated file, and the accessed file is not newly added/updated file any more. In case of accessing the link information, it is possible to open the original file.

FIG. 5 is a diagram illustrating the file list that the communication apparatus 11 acquires. If the communication apparatus 11 requests the information processing apparatus 10 to acquire the file list, the Web API processor 33 receives the request. The Web API processor 33 transfers the request to the transmission processor 32. Subsequently, the transmission processor 32 generates the file list in accordance with the user information included in the request and transfers the generated file list to the communication apparatus 11. Otherwise, it is possible to generate the file list information preliminarily and transfer the file list information generated preliminarily after receiving the request.

The transmission processor 32 generates the file list by combining the information in the public folder shown in FIG. 4 with information in the private folders and transfers the generated file list to the communication apparatus 11 via the Web API processor 33. Information in the All Users folder and information in the User A folder owned by user A who uses the communication apparatus 11 are used as the information in the public folder. Information in the All Users folder and information in the User A folder owned by user A are used as the information in the private folder. The transmission processor 32 merges this information and generates the files list shown in FIG. 5.

After the communication apparatus 11 receives the file list, starts up the dedicated application, and instructs the dedicated application to display the file list, it is possible to display the file list using the tree structure shown in FIG. 5. Each node in the tree structure is indicated by a folder, and each folder includes multiple files.

If a user accesses a file in the file list displayed on the screen of the communication apparatus 11, in order to display files in detail, the communication apparatus 11 requests the information processing apparatus 10 to generate thumbnail images along with the file information. The file information includes a file name, file type, size, created date and time, and updated date and time etc. The thumbnail image downsizes and displays the file content. In this case, it is requested to generate the thumbnail image. However, it is possible to request the file itself.

After receiving the file information and the request, the Web API processor 33 in the information processing apparatus 10 transfers the file information and the request to the transmission processor 32 and instructs to perform a necessary process. As the necessary process, the transmission processor 32 acquires the file based on the file information and generates the thumbnail image. The transmission processor 32 transfers the thumbnail image data as the processing result to the communication apparatus 11 as the origin of the request. The communication apparatus 11 displays the thumbnail image based on the received data.

If it is known that the accessed file is link information of an unread file from the received file information, the transmission processor 32 accesses the original file associated with the link information and generates the thumbnail image using the original file. If the accessed file is an original file, the transmission processor 32 generates the thumbnail image based on the original file. It is possible to refer to the original file from the link information by using the table information, functions that the generic OS implements, and property information such as a shortcut etc.

The transmission processor 32 also transfers the received file information to the unread file manager 31. The unread file manager 31 checks whether or not the link information in the unread file folder has been accessed based on the received file information. If the link information has been accessed, the link information is deleted. If the original file has been accessed, it is checked whether or not the link information in the unread file folder is associated based on the table information. If so, the associated link information is deleted. Otherwise, no process is performed. In case of adding a file, new link information is generated in the unread file folder and registered by storing the link information in the file storage area 40.

FIG. 6 is a diagram illustrating a screen displayed on the communication apparatus in case of updating a file. The detector 30 always monitors whether or not a file has been added or updated via the shared folder and the workflow function. After detecting that the file has been added or updated, the detector 30 reports the information on the file detected that has been added or updated to the unread file manager 31 via the transmission processor 32. Subsequently, the unread file manager 31 calculates the number of unread files based on the number of pieces of link information of unread files in the unread file folder and reports the number of unread files and file information of the original file associated with the link information to the PUSH notification processor 39.

The PUSH notification processor 39 acquires the information on user who accesses the file and the specific information and the information that indicates the OS type of the communication apparatus 11 from the configuration information manager 38. The PUSH notification processor 39 specifies the communication apparatus server 15 that transmits information to the communication apparatus 11 based on these information, and the PUSH notification processor 39 reports the number of unread files along with these information to the specified communication apparatus server 15.

The communication apparatus server 15 specifies the communication apparatus 11 based on the received specific information and reports the number of unread files and the specific information to the specified communication apparatus 11. In the communication apparatus 11, the OS analyzes the received specific information to identify the dedicated application. After associating the number of unread files with the icon that indicates the dedicated application, a screen shown in FIG. 6B is displayed. Before receiving the notification, a screen without displaying the number of unread files shown in FIG. 6A for example is displayed.

After browsing the number of unread files associated with the icon, it is figured out that there are files that have been added/updated. After starting up the dedicated application, the communication apparatus 11 transfers a request for acquiring the file list. After receiving the request for the acquisition, the Web API processor 33 in the information processing apparatus 10 transfers the request to the transmission processor 32 and instructs to perform necessary processes. After receiving the notification of the information on the unread files from the unread file manager 31, the transmission processor 32 generates the file list based on the file information and transfers the file list to the communication apparatus 11 via the Web API processor 33. The communication apparatus 11 displays the received file list shown in FIG. 6C. Subsequently, in the unread file manager 31, the associated link information is deleted one by one each time the unread file is accessed, and the number of unread files displayed on the icon decreases by one.

In this case, if no unread file is stored in the unread file folder, the "unread file" folder shown in FIG. 6C is not displayed. Even if an unread file is stored in the unread file folder, the "unread file" folder is not displayed on apparatuses other than the communication apparatus 11 as the notification destination. For example, if the notification destination is user A and user B, the "unread file" folder is not displayed in response to the request for acquiring the file list from the communication apparatus 11 associated with user C. By contrast, the unread file folder for user A is transferred in response to the request for acquiring the file list from the communication apparatus associated with user A, and the unread file folder for user B is transferred in response to the request for acquiring the file list from the communication apparatus associated with user B A process that the information processing system performs is described below in detail with reference to sequence diagrams shown in FIGS. 7, 8, and 9. FIGS. 7A and 7B are sequence diagrams illustrating a process that reports the number of unread files to the communication apparatus 11 and instructs the communication apparatus 11 to display the number of unread files if the client PC 13 adds or updates a file. Since the client PC 13 can perform SMB access to the network shard folder in the information processing apparatus 10, the client PC 13 can accesses any file directly and updates the file by modifying the file etc. In addition, it is possible to create a new file and store the newly created file in an arbitrary folder.

The detector 30 in the information processing apparatus 10 detects that the client PC 13 has added/updated files. The detector 30 replies to the client PC 13 that the detector 30 detects that files have been added/updated. In case of adding files in a specific folder, the workflow processor 35 executes predetermined workflow. Subsequently, the workflow processor 35 requests the transmission processor 32 to perform a necessary process. The transmission processor 32 replies the information on the file that is requested to process to the detector 30 via the workflow processor 35.

In case of adding files in a folder other than the specific folder or updating an existing file by modifying or overwriting etc., the detector 30 requests the transmission processor 32 to perform a necessary process. Similarly, the transmission processor 32 replies the information on the file requested for processing to the detector 30.

After receiving the request for processing, the transmission processor 32 performs the necessary process such as format conversion, etc. By converting the format, the file is further updated. The transmission processor 32 transfers the file information on the updated file to the unread file manger 31, and the unread file manager 31 replies by reporting that the unread file manager 31. Based on the file information, the unread file manager 31 generates and registers the link information. Since the number of unread files is modified due to the registration of the link information, the unread file manager 31 reports the number of unread files to the PUSH notification processor 39.

The PUSH notification processor 39 replies to the unread file manager 31 by reporting that the PUSH notification processor 39 receives the notification of the number of unread files and acquires specific information etc. that is necessary for communicating with the communication apparatus 11 from the configuration information manager 38. In this case, the PUSH notification processor 39 also acquires information such as IP address of the communication apparatus server 15 and accesses the communication apparatus server 15 by using the acquired information. The PUSH notification processor 39 reports the number of unread files along with the acquired specific information etc. to the communication apparatus server 15. The communication apparatus server 15 replies to the PUSH notification processor 39 by reporting that the communication apparatus server 15 receives those information, specifies the communication apparatus 11 to which the number of unread files is reported using the specific information, and reports the number of unread files and the specific information to the communication apparatus 11.

After receiving the number of unread files and the specific information etc., the communication apparatus 11 replies to the communication apparatus server 15 by reporting that the communication apparatus 11 receives the notification, specifies the dedicated application from the specific information, and displays the number of unread files associated with the icon that indicates the specified dedicated application. The user who uses the communication apparatus 11 can ascertain that there are added/updated files by browsing the displayed number of files associated with the icon.

In the embodiment shown in FIG. 7, the case that the files are added/updated by the client PC 13 is described. In case of adding/updating files by the MFP 12, the similar process is performed. FIGS. 8A and 8B are sequence diagrams illustrating a process that reports the number of unread files to the communication apparatus 11 and instructs the communication apparatus 11 to display the number of unread files if the communication apparatus 11 adds or updates a file. The processes performed by the workflow processor 35, the transmission processor 32, the unread file manager 31, the PUSH notification processor 39, and the configuration information manager 38 are similar to the processes shown in FIG. 7, so description for those processes are omitted.

Just like the client PC 13, the communication apparatus 11 cannot perform SMB access of the files managed by the information processing apparatus 10 directly. Therefore, the communication apparatus 11 starts up the dedicated application, requests the transmission processor 32 via the Web API processor 33, acquires the list of files that the information processing apparatus 10 manages, and displays the file list. The user selects an arbitrary file in the displayed file list, accesses the file via the Web API processor 33, and updates the file. In other cases, the user create a new file, accesses an arbitrary folder in the file list via the Web API processor 33, and add the newly created file to the folder. In this case, an arbitrary file is accessed after displaying the file list first. However, it is possible to access an arbitrary file via the Web API processor 33 without displaying the file list.

The detector 30 detects the file addition/update performed via the Web API processor 33. In this case, the Web API processor 33 instructs the workflow processor 35 to execute workflow or the transmission processor 32 to perform a necessary process.

Figure 9B:
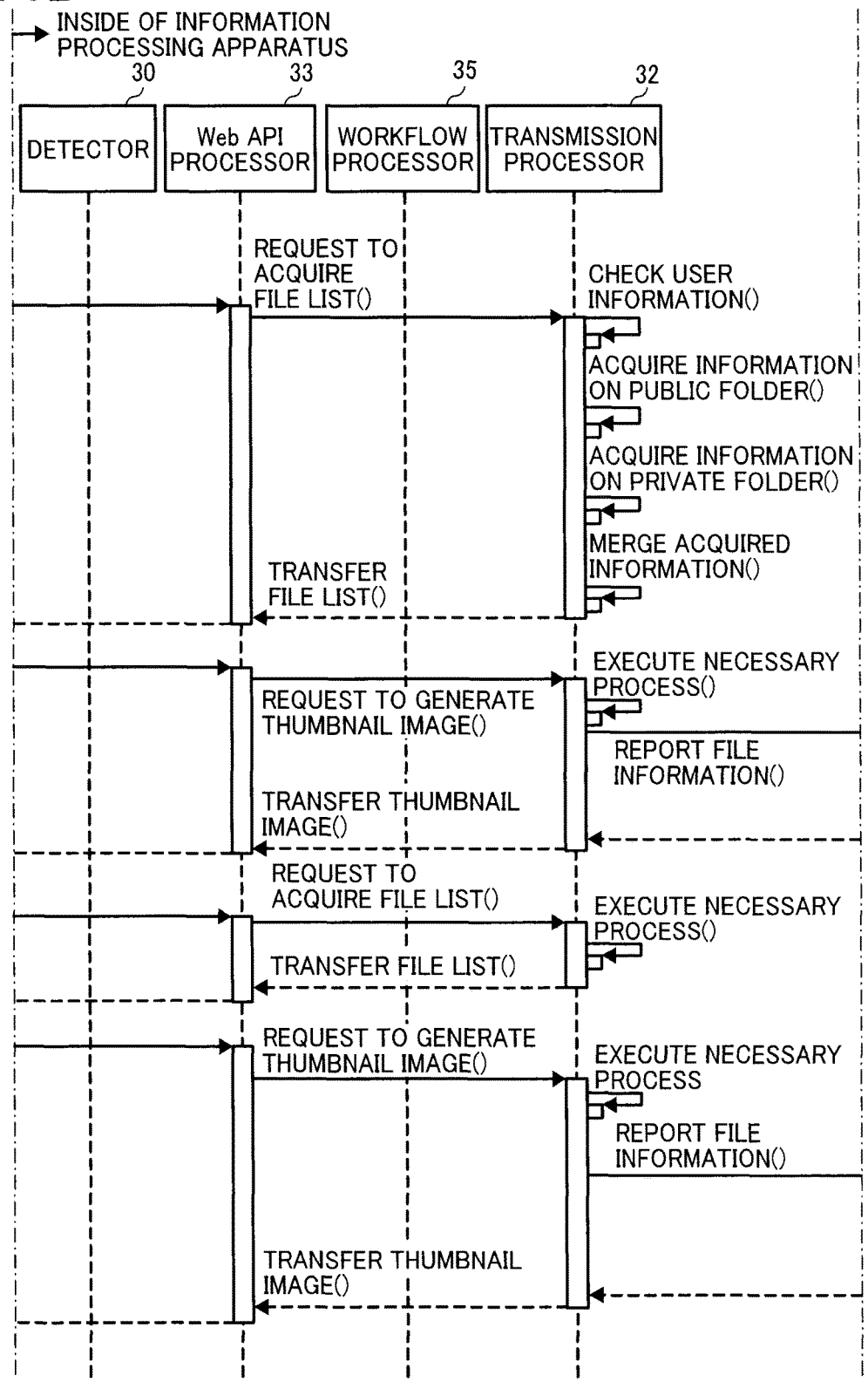
Figure 9C:
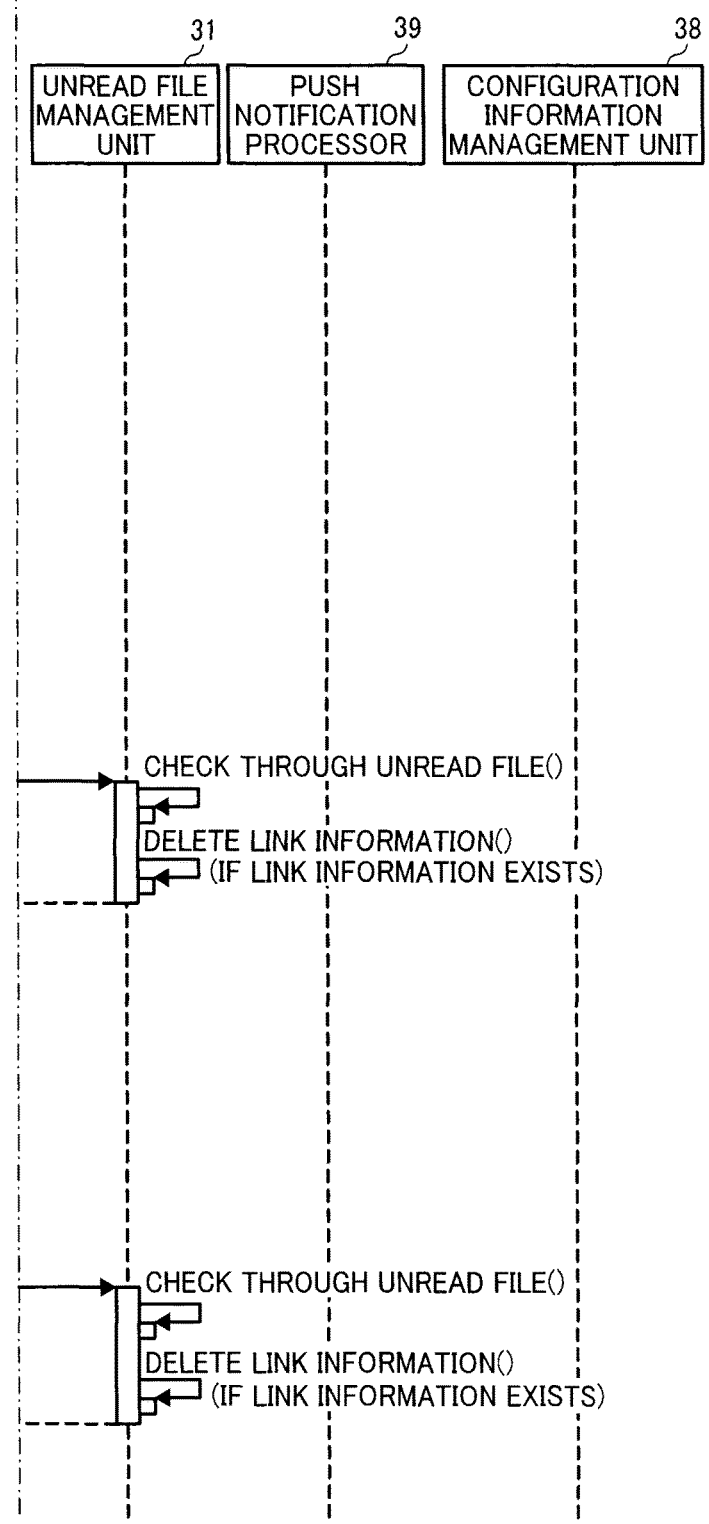

FIGS. 9A, 9B, and 9C are sequence diagrams illustrating processes performed after instructing the communication apparatus 11 to display the number of unread files. After receiving the notification of the number of unread files and the specific information from the communication apparatus server 15, the communication apparatus 11 replies to the communication apparatus server 15 by reporting that the communication apparatus 11 received those information. The communication apparatus 11 specifies the dedicated application instructed to display the number of files with reference to the specific information and displays the number of unread files associated with the icon that indicates the dedicated application.

After ascertaining that there are added/updated files, the user 100 starts up the dedicated application by tapping the icon of the dedicated application etc. and requests the web API processor 33 to acquire the file list. After receiving the request, the Web API processor 33 transfers the request to the transmission processor 32.

After checking the user information included in the request, the transmission processor 32 acquires information on the All Users folder and user 100's user folder confirmed by the user information. If user A is confirmed, information on user A folder is acquired. In addition, the transmission processor 32 also acquires information on All Users folder and user 100's user folder confirmed by the user information from private files stored in the file storage area 40. Subsequently, the transmission processor 32 generates the file list by combining that information and outputs the file list to the Web API processor 33. The Web API processor 33 transfers the file list to the communication apparatus 11, and the communication apparatus 11 displays the file list so that user 100 can browse the file list.

In this case, the user information included in the request is checked. In other cases, the specific information of the communication apparatus can be included in the request. In that case, it is possible to identify the information on the unread folder in the private folder using the user authority managed associated with the specific information of the communication apparatus. By adopting the configuration described above, without registering the user information in the communication apparatus 11, since the user information is associated with the specific information of the apparatus on the information processing apparatus 10 side, it is possible to manage whether or not a file is added newly (there is an unread file) for each user.

If user 100 selects and accesses one link information included in the unread file folder in the displayed file list, the communication apparatus 11 requests to acquire a thumbnail image of the unread file associated with the link information. After receiving the request, the Web API processor 33 requests the transmission processor 32 to generate the thumbnail image. As a necessary process, the transmission processor 32 acquires an original file associated with the link information and generates the thumbnail image form the original file. In addition, the transmission processor 32 transfers the information on the file to the unread file manger 31.

The unread file manager 31 checks the link information included in the unread file folder that the unread file manager 31 manages. If the link information exists, the link information is deleted. That is because the file is not a newly added/updated file any longer due to the access. Since the link information in the unread file folder is modified and the number of unread files is changed due to the deletion, the unread file manger 31 reports that information to the transmission processor 32. The transmission processor 32 transfers the thumbnail image data requested by the communication apparatus 11 to the communication apparatus 11 via the Web API processor 33. The communication apparatus 11 displays the thumbnail image based on the received data.

If the unread files are managed for each user information, it is possible to delete the link information managed associated with user 100's user information. For example, if user A acquires the original file, the link information in the user A's unread folder is deleted, and the link information in the user B's unread folder is not deleted. Consequently, it is possible to leave the link information in user B's unread folder until user B acquires the original file.

User 100 can request to stop displaying the thumbnail image and display the file list. After receiving this request, the communication apparatus 11 request the Web API processor 33 to acquire the file list. The Web API processor 33 transfers the request for the acquisition to the transmission processor 32. As necessary processes, the transmission processor 32 updates the file list by modifying it using the combined file list described above and modified information described above and transfers the updated file list to the communication apparatus 11 via the Web API processor 33. The communication apparatus 11 displays the received file list.

User 100 can access not the link information included in the unread file folder in the displayed file list but original files included in other folders. If user 100 selects and accesses the original file, the communication apparatus 11 requests to acquire the thumbnail image of that file. After receiving the request, the Web API processor 33 requests the transmission processor 32 to generate the thumbnail image. As a necessary process, the transmission processor 32 generates the thumbnail image from the original file. The transmission processor 32 reports the file information on that file to the unread file manager 31.

The unread file manager 31 checks the link information associated with the original file included in the unread file folder that the unread file manager manages. If the link information exists, the link information is deleted. Since the link information included in the unread file folder ant the number of unread files is modified by deleting the link information, the unread file manager 31 reposts those information to the transmission processor 32. The transmission processor 32 transfers the thumbnail image data that the communication apparatus 11 requests to the communication apparatus 11 via the Web API processor 33. The communication apparatus 11 displays the thumbnail information based on the received data.

Since they are grouped into the unread file folder that is distinguishable from other folders on the file list displayed on the communication apparatus 11, the user can ascertain which files have been added or updated easily. As a result, it is unnecessary that the user needs to search for added/updated files, and that can enhance the user convenience.

In the embodiment described above, the information processing apparatus 10 reports the number of unread files to the communication apparatus 11, and the number of unread files is displayed on the screen of the communication apparatus 11. With this configuration, the user can instantly ascertain that there are added or updated files, for example, visually.

For example, if updating of a document file is not reported to the communication apparatus even if the document file stored in the information processing apparatus is updated, the user can hardly see which document file has been updated by browsing the document list screen displayed on the communication apparatus. Similarly, in case of adding a document file, it is unclear which document file has been added. As a result, in case of trying to browse the updated file or the added file, it takes time to find the file, which is inconvenient.

As described above, in case of updating and adding files managed by an information processing apparatus, the information processing apparatus 10, which may cooperate with the other apparatus or system, is capable of displaying a screen that indicates which file has been updated or added.

In addition, by starting up the dedicated application, requesting to acquire the file list, acquiring and displaying the file list, and referring to the unread files included in the unread file folder in the file list, it is possible to ascertain the added/updated files visually. However, the method of ascertaining the added/updated files visually is not limited to the case described above, and it is possible to adopt other methods. The other method of ascertaining the added/updated files visually is described below in detail.

Figure 10:
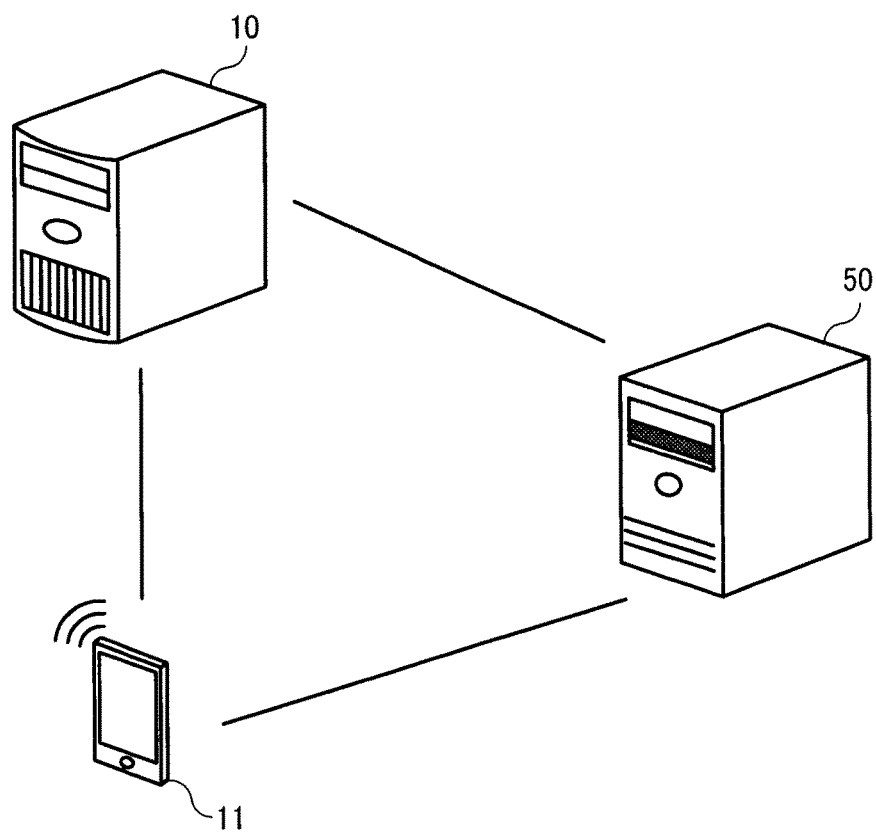
FIG. 10 is a diagram illustrating another configuration of an information processing system.

FIG. 10 is a diagram illustrating another configuration of the information processing system. As described above, the information processing system at least includes the dedicated application implemented in the information processing apparatus 10 and the communication apparatus 11 communicable with the information processing apparatus 10. If the dedicated application is implemented in the information processing apparatus 10, the information processing apparatus can consist of the information processing apparatus 10 and the communication apparatus 11 only. In the embodiment shown in FIG. 10, in addition to the information processing apparatus 10 and the communication apparatus 11, a messaging server 50 that receives a request of distributing a message and distributes the message. The messaging server 50 functions as a relay apparatus that relays the message exchange.

While not shown in FIG. 10, the information processing system can further include at least any one of the MFP 12, the client PC 13, the relay server 14, and the communication apparatus server 15 shown in FIG. 1. Just like the configuration shown in FIG. 1, the information processing apparatus 10 can be connected to the communication apparatus 11 via the LAN, and the information processing apparatus 10 can be connected to the communication apparatus 11 via the relay server 14, the communication apparatus server 15 and the WAN. The information processing apparatus 10 can be connected to the messaging server 50 via the LAN or WAN, and the messaging server 50 can be connected to the communication apparatus 11 via the LAN or WAN. It is possible that the messaging server 50 is connected to the relay server 14 and the communication apparatus server 15 and configured to communicate with the information processing apparatus 10 and the communication apparatus 11 via the relay server 14 and the communication apparatus server 15. Since the hardware configuration of the messaging server 50 is similar to the hardware configuration of the information processing apparatus 10 shown in FIG. 2, the description for the hardware configuration of the messaging server 50 is omitted here.

Figure 11:
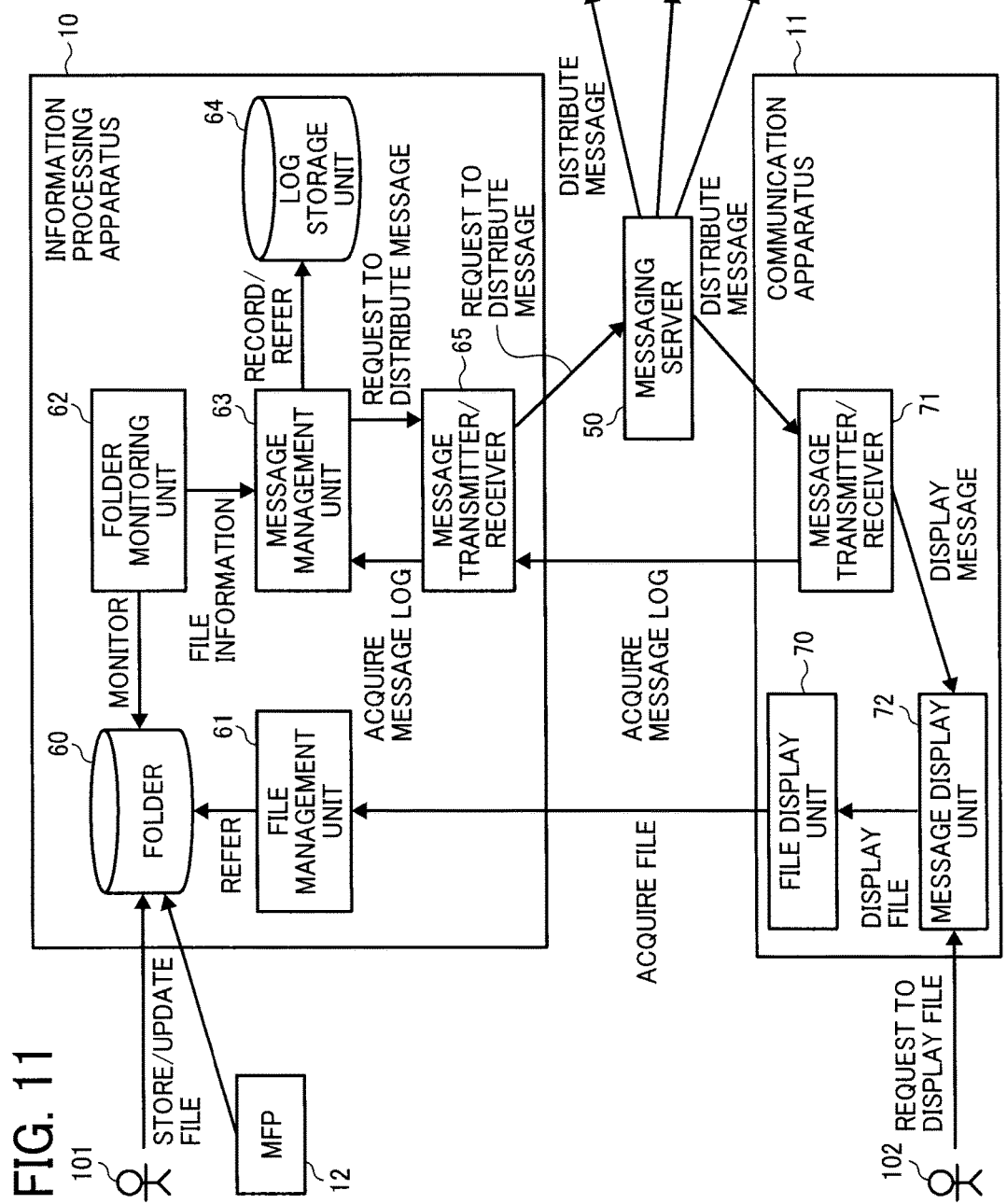
FIG. 11 is a block diagram illustrating functions of the information processing apparatus and the communication apparatus included in the information processing system in FIG. 10.

The other method described above is described below in detail with reference to FIG. 11. FIG. 11 is a block diagram illustrating functions of the information processing apparatus and the communication apparatus included in the information processing system in FIG. 10. In FIG. 11, the MFP 12, the messaging server 50, and other communication apparatuses 51, 52, and 53 are shown.

The information processing apparatus 10 includes a folder 60 that has the same function as the file storage area 40 shown in FIG. 3, a file management unit 61 that monitors files in the folder 60, and a folder monitoring unit 62 that has the same function as the detector 30. In addition, the information processing apparatus 10 includes a message management unit 63 that has the function of managing the file information of the added/updated files just like the unread file manager 31 and the function of generating the display information just like the transmission processor 32. Furthermore, the information processing apparatus 10 includes a log storage unit 64 that stores a message that the message management unit 63 generates as a message log. The information processing apparatus 10 includes a transmitter/receiver 65 that exchanges the message and the message log with the communication apparatus 11 and the messaging server 50 and has the same function as the transmission processor 32 shown in FIG. 3.

The communication apparatus 11 implements the dedicated application and includes a file display unit 70 that operates on the dedicated application, a message transmitter/receiver 71, and the message display unit 72. Other communication apparatuses 51, 52, and 53 include the same functional units.

After receiving facsimile data or scan data by scanning a document, the MFP 12 transfers the data as a file to the folder 60 included in the information processing apparatus 10 as a predetermined storage area and instructs the folder to store the data. While only one folder 60 is shown in FIG. 11, it is possible to include multiple folders such as a dedicated facsimile folder that stores facsimile data and a dedicated scanning folder that stores scanned data. After user 101 requests to store the file in the folder or update it, the information processing apparatus 10 receives the request, adds a file to the folder 60 newly, or updates the file.

Figure 12:
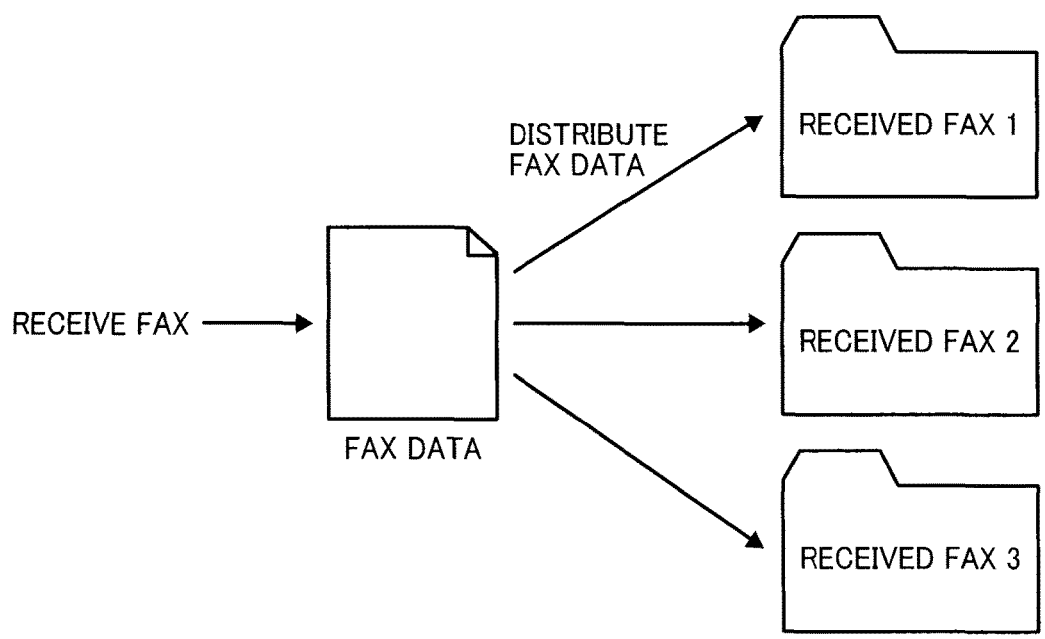
FIG. 12 is a diagram illustrating a folder.

The dedicated facsimile folder that stores facsimile data after receiving a fax and the dedicated scanning folder that stores scanned data after scanning a document are not limited to one, and it is possible that multiple dedicated facsimile folders and dedicated scanning folders can be included. As shown in FIG. 12, there are three dedicated facsimile folders, mail address, user name, and group name, etc., as information for identifying the message destination can be associated to each folder. Facsimile data acquired by receiving a facsimile can be distributed to one of three folders in accordance with a facsimile transmission origin specified by a facsimile number or facsimile content. The case described above is just an example, and the data can be distributed in accordance with other information. The information for identifying the distribution origin is associated with the destination information such as IP address and MAC address etc.

The folder 60 can perform converting a file format. In this case, in addition to the information for identifying the distribution destination described above, information on how the file is converted can be associated with the folder 60. For example, information on converting a bmp file into a JPEG file or a PDF file.

Figure 13A:
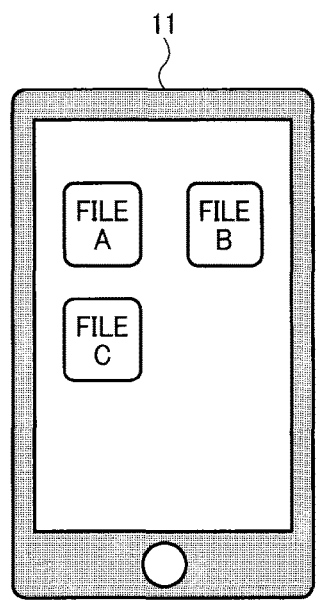
FIGS. 13A, 13B, 13C and 13D are diagrams illustrating a process of uploading a file.
Figure 13B:
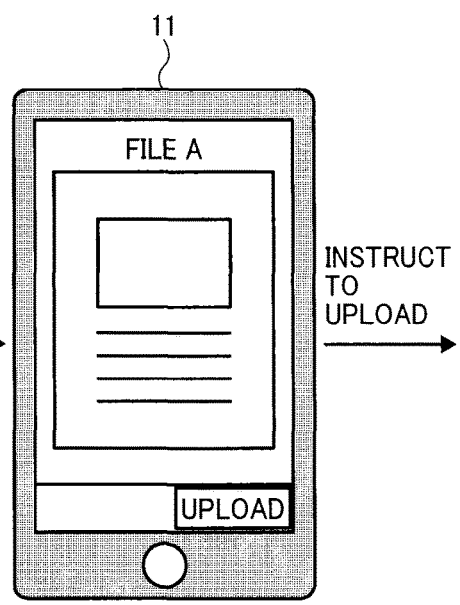
Figure 13C:
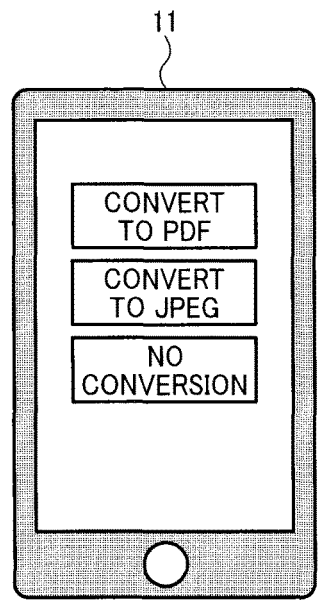
Figure 13D:
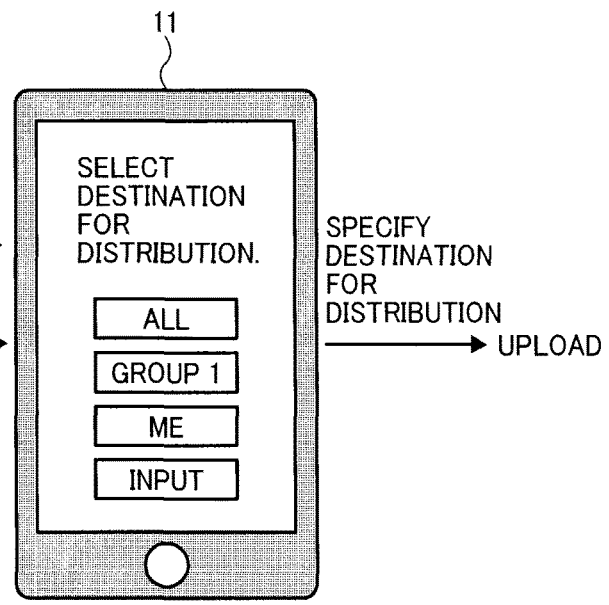

In addition to the facsimile data and scanned data, a file uploaded from the communication apparatus 11 can be stored in the folder 60. In case of uploading a file from the communication apparatus 11 and storing it in the folder 60, as shown in FIG. 13A, files A, B, and C are displayed on the screen of the communication apparatus 11, and file A to be uploaded is selected by tapping it. Subsequently, it is requested to upload file A by tapping an upload button displayed lower right on the screen. As a result, on the screen shown in FIG. 13C, it is possible to select that file A to be uploaded is stored after converting into PDF or JPEG. In case of not performing the conversion, "no conversion" can be selected. Lastly, on the screen shown in FIG. 13D, the distribution destination is selected, and the file is uploaded. While it is possible to predetermine the distribution destination of a message, the distribution destination can be selected as shown in FIG. 13D. In this case, the communication apparatus 11 transfers the configured information, i.e., information that indicates the distribution destination (e.g., information that indicates a group or a user) along with the request for uploading to the information processing apparatus 10.

The folder monitoring unit 62 monitors if a new file has been stored in the folder 60 or a file in the folder 60 has been updated. After detecting that the file has been stored or updated, the folder monitoring unit 62 reports the file information of the stored/updated file A to the message management unit 63. The file information also includes the information on the distribution destination. The message management unit 63 generates a message as display information to be displayed on the communication apparatus 11 from the file information reported from the folder monitoring unit 62. The message management unit 63 transfers the generated message to the message transmitter/receiver 65 and stores the generated message as a message log in the log storage unit 64.

The message transmitter/receiver 65 transfers a message to the messaging server 50 and requests to distribute the message to the communication apparatus 11 and other communication apparatuses 51, 52, and 53. After receiving the request of acquiring the file from the communication apparatus 11, the file management unit 61 searches for the requested file among files stored in the folder 60 that the communication apparatus 11 manages itself and transfers the requested file to the communication apparatus 11. Similarly, in case of receiving the request of acquiring the file from other communication apparatuses 51, 52, and 53, the file management unit 61 searches through the folder 60 and transfers the requested file to the communication apparatuses 51, 52, and 53. The messaging server 50 distributes the message received from the message transmitter/receiver 65 to the communication apparatus 11 and other communication apparatuses 51, 52, and 53. The message transmitter/receiver 65 transfers the request for the message distribution including the message and the information on the distribution information to the messaging server 50. As a result, the messaging server 50 distributes the message based on the information on the distribution destination included in the request for the message distribution.

The communication apparatus 11 receives the message distributed from the messaging server 50 using the message transmitter/receiver 71. The message received by the message transmitter/receiver 71 is transferred to the message display unit 72, and the message display unit 72 displays the message on the screen of the communication apparatus 11. As described above, it is possible to distribute and display the message immediately in case of storing/updating the file, it is possible to ascertain that the file has been stored or updated in real time.

User 102 refers to the message displayed on the screen and requests to display the file that corresponds to the message. After receiving the request, the message display unit 72 transfers the request to the file display unit 70. The file display unit 70 transfers the request to the information processing apparatus 10 and acquires the file that corresponds to the request from the information processing apparatus 10. Subsequently, the file display unit 70 displays the content of the acquired file on the screen of the information apparatus 11. As a result, it is possible to browse the file easily after referring to the message.

The message display unit 72 displays the messages distributed by the messaging server 50 in time line format that lays out the messages in chronological order. Regarding the messages, in addition to the received message, the predetermined number of message log received recently is displayed. If only ten messages can be displayed, messages received before then are deleted and not displayed on the screen. If user 102 wants to browse messages received before then, user 102 requests the message display unit 72 to acquire the message log, and the message display unit 72 transfers the request to the message transmitter/receiver 71. The message transmitter/receiver 71 transfers the request for the message log acquisition to the information processing apparatus 10.

After receiving the request, the message transmitter/receiver 65 in the information processing apparatus 10 transfers the request to the message management unit 63. In order to acquire the requested message, the message management unit 63 refers to the log storage unit 64 and acquires the corresponding message log. Subsequently, the message log is transferred to the communication apparatus 11 via the message transmitter/receiver 65. For example, in case of acquiring the message log for ten items before then, the communication apparatus 11 requests to acquire the message log for ten items previously from the update date and time of the message log currently displayed. In accordance with the request, the message management unit 63 in the information processing apparatus 10 search through the message log in the log storage unit 64 based on the saved date and time and updated date and time and acquires the requested message log.

After receiving the message log from the information processing apparatus 10, the message transmitter/receiver 71 in the communication apparatus 11 transfers the received message log to the message display unit 72. The message display unit 72 displays the received message log on the screen in time line format.

Example cases of updating a file are updating a file by overwriting the file by user operation, receiving a file from the MFP 12 etc., converting a file format on the information processing apparatus 10, moving a file, and updating a file by the information processing apparatus 10 itself. It should be noted that the file update is not limited to those cases described above.

FIG. 14 is a flowchart illustrating a process performed between the information processing apparatus 10 and the communication apparatus 11 shown in FIG. 11. In this process, the communication apparatus 11 requests the information processing apparatus 10 to acquire the message log and displays the acquired message log on the screen. After starting the process in S1400, the communication apparatus 11 request the information processing apparatus 10 to acquire the message log in S1410. This request for the acquisition is transferred to the information processing apparatus 10 by the message transmitter/receiver 71. The request for the acquisition includes the number of message logs to be acquired.

In S1420, after the information processing apparatus 10 receives the request, the message management unit 63 picks up the specified number of message logs from the log storage unit 64 in reverse chronological order and transfers them to the communication apparatus 11 via the message transmitter/receiver 65. In S1430, the message display unit 72 displays the message log received by the message transmitter/receiver 71 in the communication apparatus 11 on the screen, and the process ends in S1440.

FIG. 15 is a flowchart illustrating a process performed among the information processing apparatus 10, the communication apparatus 11, and a messaging server 50 shown in FIG. 11. This process is performed, when the message is displayed on the screen of the communication apparatus 11, in case of storing or updating a file in the folder 60 in the information processing apparatus 10.

After starting the process in S1500, the information processing apparatus 10 detects that a file is stored or updated in S1510. The folder monitor monitoring unit that monitors the folder 60 detects that. In S1520, the message management unit 63 generates a message from file information of the stored/updated file. In S1530, the message management unit 63 transfers the generated message to the message transmitter/receiver 65, ant the message transmitter/receiver 65 requests the messaging server 50 to distribute the message. In addition, the message management unit 63 stores the generated message as the message log in the log storage unit 64.

In S1540, the messaging server 50 distributes the message received from the message transmitter/receiver 65 based on the information on the distribution destination received simultaneously. In the communication apparatus 11 as the distribution destination, the message transmitter/receiver 71 receives the message and transfers the message to the message display unit 72 in S1550. In S1560, the message display unit 72 displays the message on the screen of the communication apparatus 11, and the process ends in S1570.

Figures 16, 17:
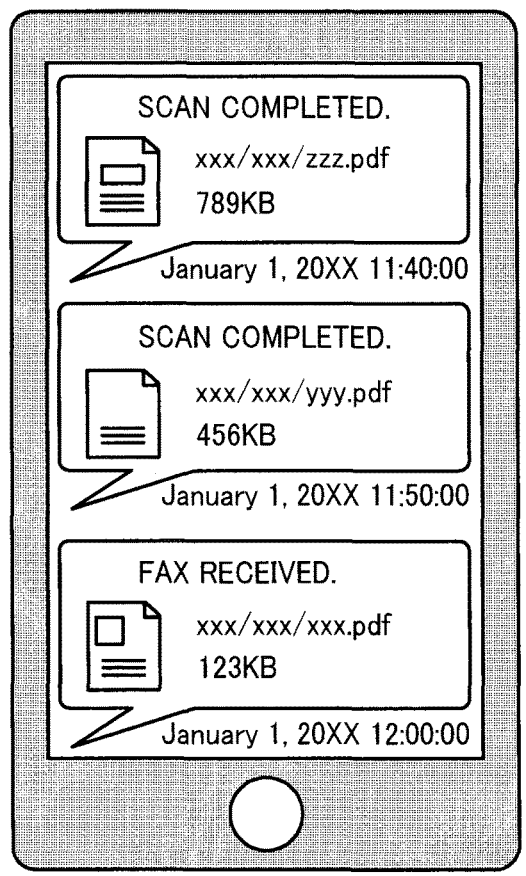
FIG. 16 is a diagram illustrating information included in a message distributed in the process shown in FIG. 15.
FIG. 17 is a diagram illustrating a screen displayed on the communication apparatus in the process shown in FIG. 15.

FIG. 16 is a diagram illustrating information included in the request for the message distribution transferred to the messaging server 50 in the process shown in FIG. 15. The folder monitoring unit 62 monitors the folder 60. If an added or updated file is detected, the folder monitoring unit 62 generates a message from information associated with the folder 60 that stores the file, information associated with the file, and the content of the file.

An example of the information associated with the folder 60 is a folder name. In case of a folder that stores facsimile data, the folder name can be "Received Fax". It is possible to generate a notification "Fax is received" using the folder name. Examples of information associated with the file are file attributes such as file path, updated date/time of the file, and file size. An example of the information generated from the content of the file is reduced-size image data of the first page of the file (file thumbnail). Uniform Resource Locator (URL) can be used as the file path.

After receiving the request for the message distribution from the message transmitter/receiver 65 in the information processing apparatus 10, the messaging server 50 distributes the message shown in FIG. 16 to the communication apparatus 11 as the distribution destination based on the information on the distribution destination. After receiving the message, the communication apparatus 11 displays the message in time line format.

FIG. 17 is a diagram illustrating a screen displayed on the communication apparatus 11. For example, in the message balloon, the notification content, file path, thumbnail image, and file size are displayed, and the file updated date/time and file saved date/time are displayed adjacent to the lower part of the message balloon. On the screen, the messages are displayed in chronological order based on the file updated date/time or the file saved date/time. The case that displays the messages is an example and is not limited to that. Therefore, the message can consist of the notification content, file path, and updated date/time only, or the message can include other information. By including the thumbnail message, it is possible to ascertain which file is saved and updated without opening the file actually.

Figure 18:
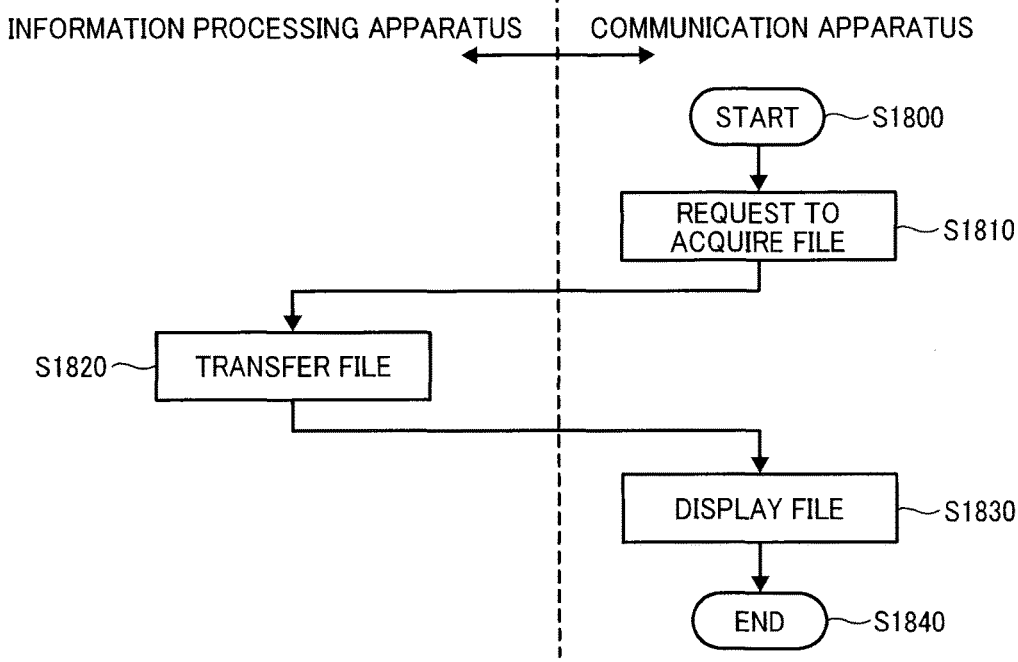
FIG. 18 is a flowchart illustrating another process performed between the information processing apparatus and the communication apparatus in FIG. 11.

FIG. 18 is a flowchart illustrating another process performed between the information processing apparatus 10 and the communication apparatus 11 in FIG. 11. In this process, a file is acquired using the file information included in the message and displayed. If user 102 selects a message by tapping one of the message balloons displayed on the screen of the communication apparatus 11 etc., the process starts from S1800. In S1810, the file display unit 70 generates the request for the file acquisition using the file information included in the message displayed in the message balloon and transfers the request to the information processing apparatus 10.

In the information processing apparatus 10, the file management unit 61 searches through the folder 60, finds out the requested file, and transfers the requested file to the communication apparatus 11 in S1820. The file can be found out using the file path. In S1830, the file display unit 70 in the communication apparatus 11 acquires the file and displays the content of the file on the screen of the communication apparatus 11. The process ends in S1840.

Figure 19:
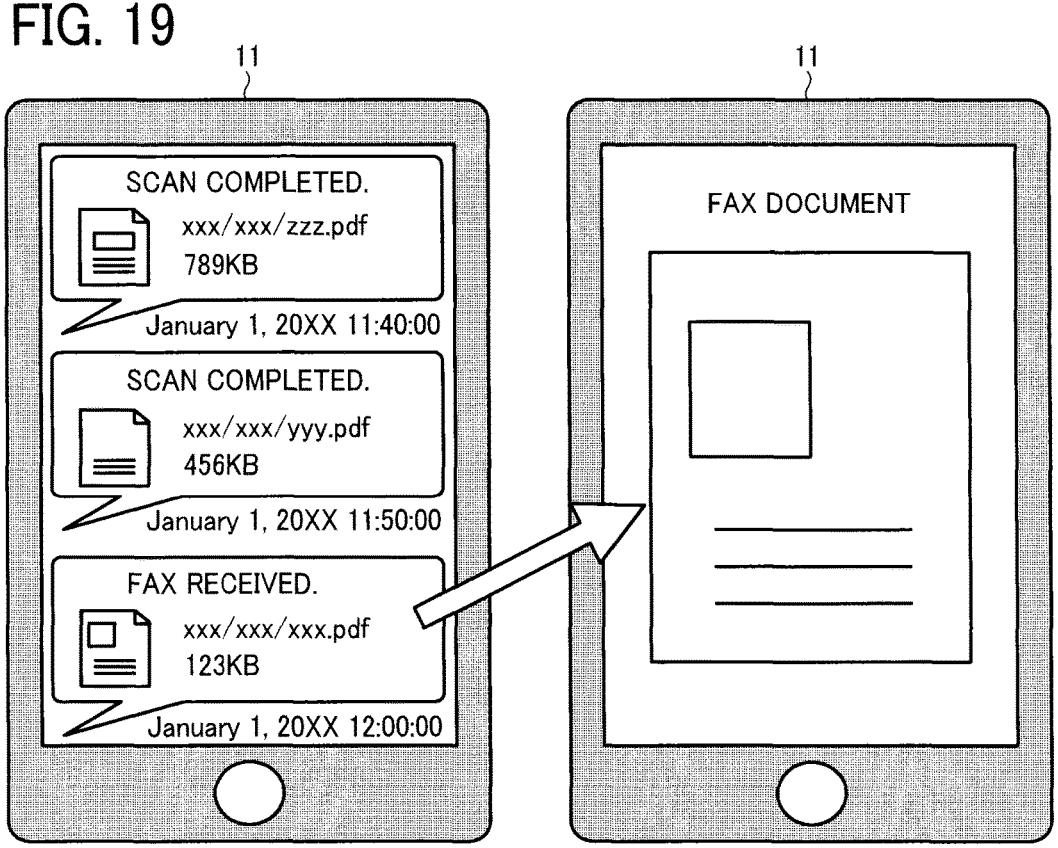
FIG. 19 is a diagram illustrating a screen displayed on the communication apparatus in the process shown in FIG. 18.

FIG. 19 is a diagram illustrating a screen displayed on the communication apparatus 11 in the process shown in FIG. 18. In case of tapping one of the multiple messages shown in FIG. 19 by user operation, the file whose file path is included in the message is acquired from the information processing apparatus 10. In this case, the communication apparatus 11 requests to acquire facsimile data, and the information processing apparatus 10 sends back the facsimile data. The communication apparatus 11 opens the acquired facsimile data, and the content of the facsimile data shown in FIG. 19, i.e., the facsimile document, is displayed.

The information processing system shown in FIG. 10 consists of three apparatuses, the information processing apparatus 10, the communication apparatus 11, and the messaging server 50, and the process described above can be implemented if the dedicated application has already started up on the communication apparatus 11. Therefore, if the dedicated application has not started yet, the messaging server 50 cannot distribute the message to the communication apparatus 11. In this case, it is not possible to ascertain that a file has been stored or updated immediately.

Figure 20:
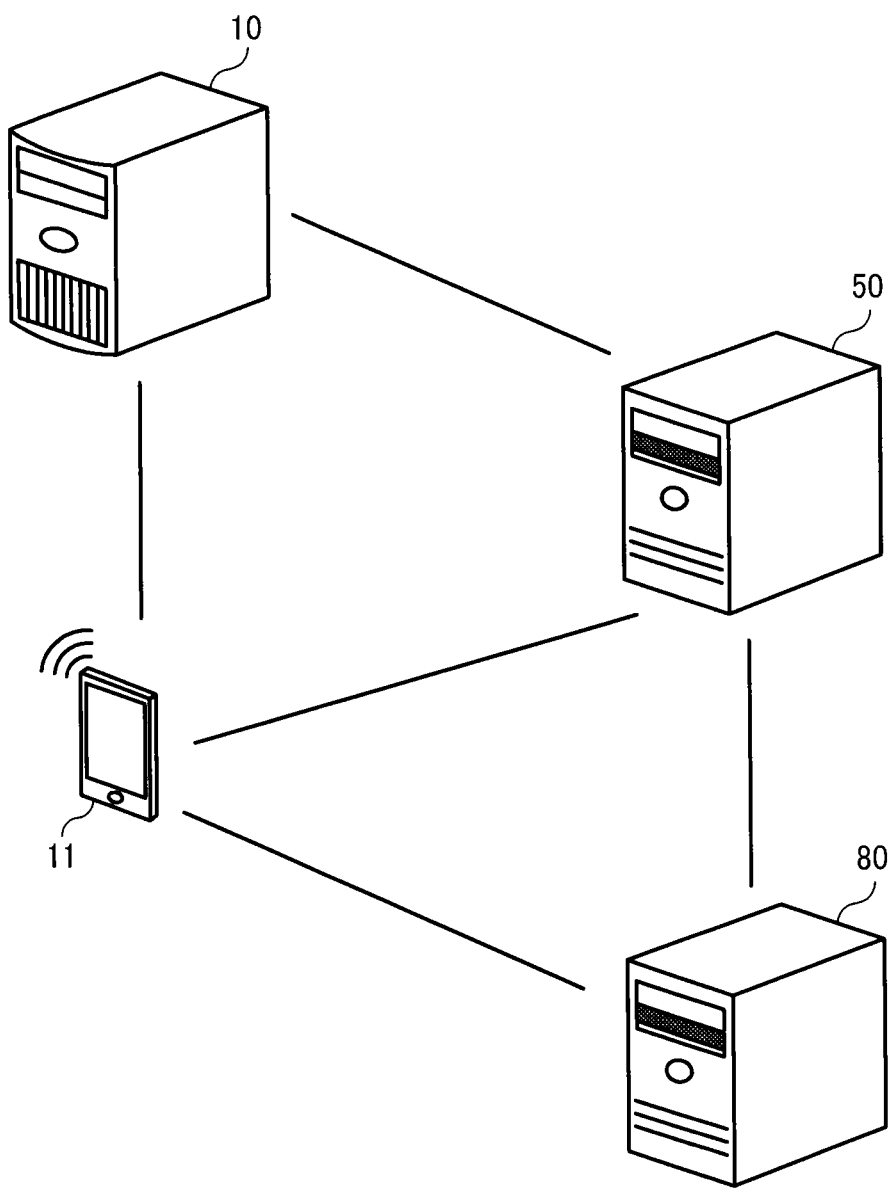
FIG. 20 is a diagram illustrating yet another configuration of the information processing system.

In order to cope with this issue and be able to distribute the message even if the dedicated application has not started yet, the information processing system can further include a push notification server 80 in addition to these three apparatuses. Just like the communication apparatus server 15 in FIG. 1, the push notification server 80 is a server apparatus that performs a push notification. FIG. 20 is a diagram illustrating yet another configuration of the information processing system. In addition to these four apparatuses, the information processing system can include at least any one of the MFP 12, the client PC 13, and the relay server 14.

The push notification server 80 is connected to the messaging server 50 and the communication apparatus 11 via the LAN or WAN and performs the push notification after receiving the request for the push notification from the messaging server 50. In performing the push notification, the push notification server 80 reports to the communication apparatus 11 that there is a newly-arrived message and instructs the communication apparatus 11 to start up the dedicated application.

Figure 21:
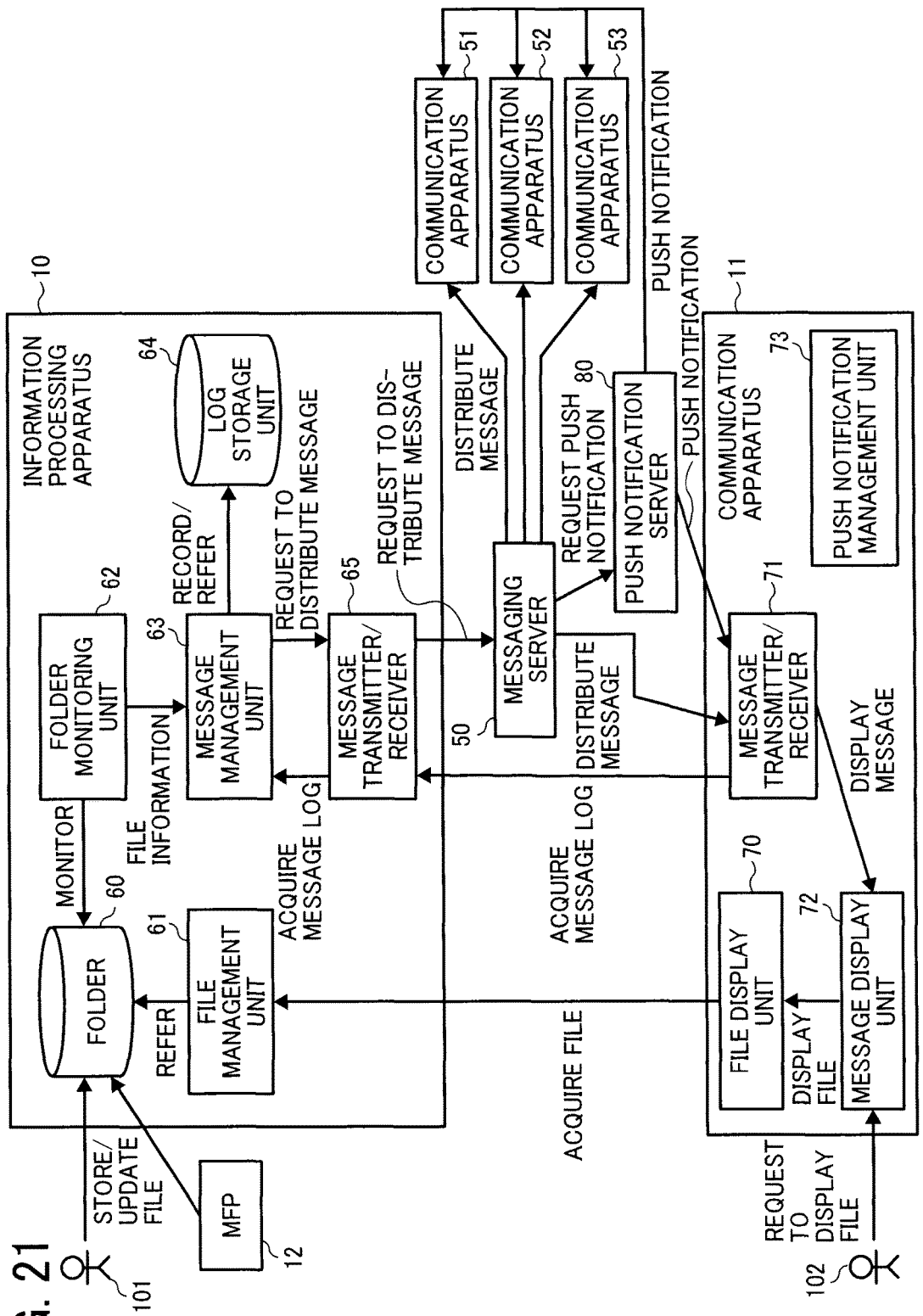
FIG. 21 is a block diagram illustrating functions of the information processing apparatus and the communication apparatus included in the information processing system in FIG. 20.

FIG. 21 is a block diagram illustrating functions of the information processing apparatus and the communication apparatus included in the information processing system in FIG. 20. The MFP 12, the messaging server 50, other communication apparatuses 51, 52, and 53, and the push notification server 80 as the notification apparatus are also shown in FIG. 21. Since the communication between the MFP 12 and the information processing apparatus 10, the communication between the information processing apparatus 10 and the messaging server 50, and the communication between the information processing apparatus 10 and the communication apparatus 11 are similar to the cases described before, the description for those cases is omitted here. In this case, only different points are described.

If the dedicated application in the communication apparatus 11 has already started up and the messaging server 50 has a message to be distributed, the messaging server 50 can distribute the message to the communication apparatus 11 directly. If the dedicated application in the communication apparatus 11 has not started up yet, it is impossible to distribute the message to the communication apparatus 11, so the messaging server 50 transfers the request for the push notification to instruct the push notification server 80 to perform the push notification. After receiving the request, the push notification server 80 performs the push notification to the communication apparatus 11 as requested.

The information processing apparatus 10 is considered as the same functional configuration as shown in FIG. 11. However, the communication apparatus 11 further includes a push notification management unit 73 in addition to the functional configuration shown in FIG. 11. After receiving the push notification from the push notification server 80, the push notification management unit 73 starts the dedicated application in the communication apparatus 11. As a result, it is possible that the messaging server 50 distributes the message to the communication apparatus 11.

After starting up the dedicated application, the communication apparatus 11 can report to the information processing apparatus 10 that the communication apparatus 11 can distribute the message. Along with that, the message transmitter/receiver 65 in the information processing apparatus 10 transfers the request for the message distribution to the messaging server 50, and the messaging server 50 can distribute the message to the communication apparatus 11. If the message cannot be distributed since the dedicated application has not started yet, the communication apparatus 11 transfers the request for acquiring the message log to the information processing apparatus 10, and it is possible to acquire the message that has not been able to distributed as the message log.

Figure 22B:
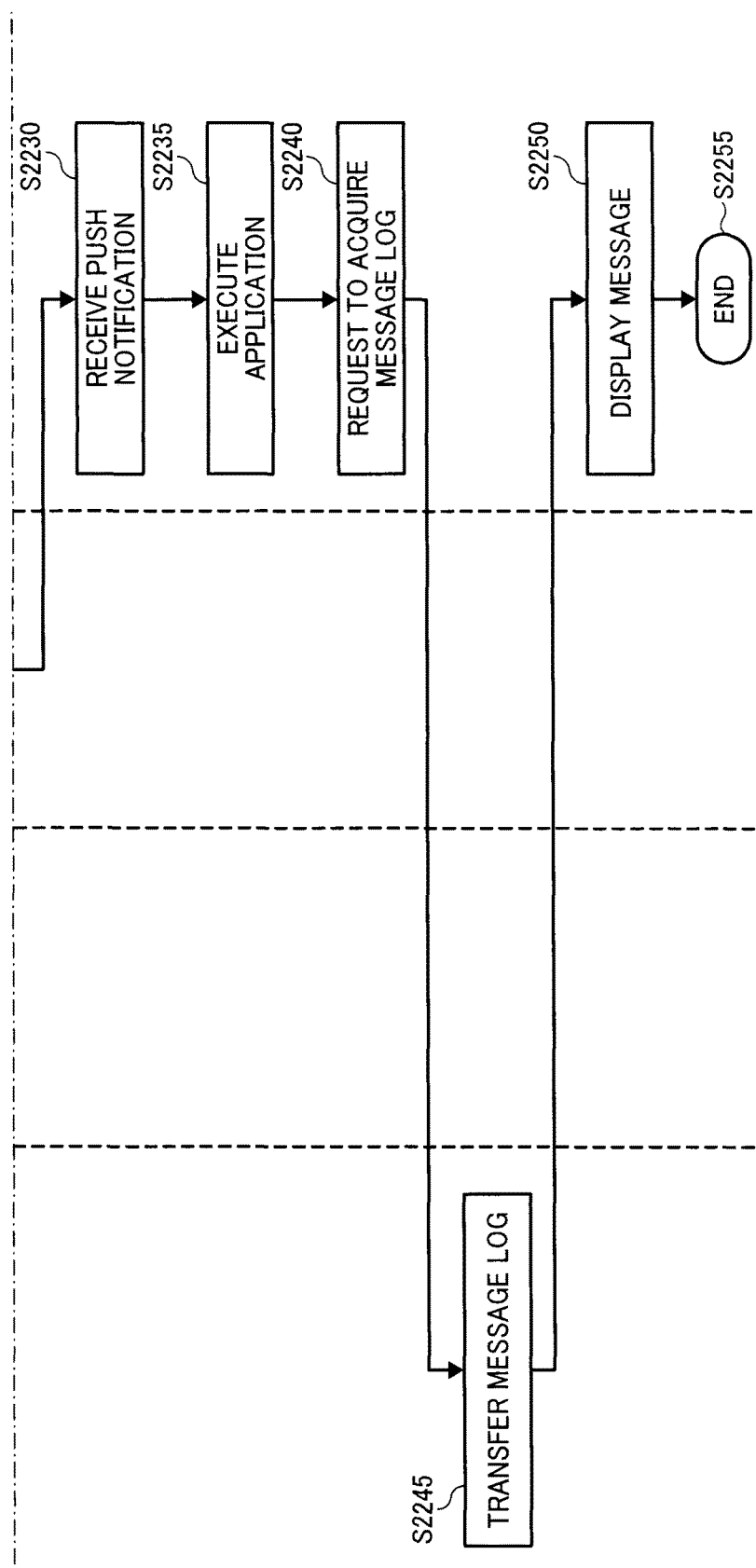

FIGS. 22A and 22B are flowcharts illustrating a process performed among the information processing apparatus 10, the communication apparatus 11, the messaging server 50, and the push notification server 80 in FIG. 20. After starting this process in S2200, the information processing apparatus 10 detects that a file has been saved or updated in S2205. This is detected by the folder monitoring unit 62 that monitors the folder 60. In S2210, the message management unit 63 generates a message from the information on the stored/updated file. In S2215, the message management unit 63 transfers the generated message to the message transmitter/receiver 65, and the message transmitter/receiver 65 requests the messaging server 50 to distribute the message. In addition, the message management unit 63 stores the generated message in the log storage unit 64 as the message log.

In S2220, the messaging server 50 requests the push notification server 80 to perform the push notification. In S2225, the push notification server 80 performs the push notification to the communication apparatus 11. In S2230, the message transmitter/receiver 71 in the communication apparatus 11 receives the push notification. In S2235, the push notification management unit 73 starts up the dedicated application.

In S2240, the message transmitter/receiver 71 requests the information processing apparatus 10 to acquire the message log. In S2245, after the message transmitter/receiver 65 in the information processing apparatus 10 receives the request, the message management unit 63 searches through the log storage unit 64 and acquires the corresponding message log. Subsequently, the message management unit 63 transfers the acquired message log to the message transmitter/receiver 65, and the message transmitter/receiver 65 transfers the message log to the communication apparatus 11.

In S2250, after the message transmitter/receiver 71 in the communication apparatus 11 receives the message log, the message display unit 72 displays the message log on the screen of the communication apparatus 11, and the process ends in S2255.

Here, the content displayed on the screen of the communication apparatus 11 is described below in detail with reference to FIG. 23. If an application is not started up, a list of applications installed in the communication apparatus 11 is displayed on the screen as shown in FIG. 23A. If the push notification server 80 performs the push notification to the communication apparatus 11 and the communication apparatus 11 receives the push notification, it is reported to the dedicated application (application A) that there is a message. For example, as shown in FIG. 23B, the number of unread messages is displayed on the icon of application A. After receiving the user input and starting up the dedicated application (application A), as shown in FIG. 23C, on the screen, the number of unread messages transferred from the messaging server 50 is displayed on the upper right of the message button in the menu bar. As a result, it is possible to ascertain that there are unread messages and ascertain the number of the unread messages.

In case of selecting by tapping the message button shown in FIG. 23C, the screen shown in FIG. 23D is displayed. For example, as groups, cells such as "All" that indicates all groups, "group A" that indicates a specific group, and "group A leader" that indicates a leader of group A are displayed, and each name and the number of unread files are displayed in each cell. "All" can acquire messages distributed to all groups, any one of all groups, and any user in the group.

"Group A" can acquire messages distributed group A and any user in group A. "Group A leader" can acquire messages distributed to the leader of group A. Here, only three cells are displayed. However, other cells can be added, or only one or two cells among three cells can be displayed. The grouping is not limited to the case described above, and it is possible to perform other grouping.

In case of selecting by tapping "All" shown in FIG. 23D, messages distributed all groups, any group, all users who belong to the group are displayed in time line format as shown in FIG. 23E. This is similar to the screen shown in FIG. 17. In FIG. 23E, in addition to the notification content, file path, file size, updated date/time, and the thumbnail image, the group name and user name are added.

In case of selecting by tapping the message balloon that includes the group name, user name, and notification content etc. shown in FIG. 23E, it is possible to acquire the file updated or stored in the folder 60 reported by the message and display the file.

In the configuration shown in FIG. 10, the message transmitter/receiver 65 in the information processing apparatus 10 only requests the messaging server 50 to distribute the message, and it is not confirmed whether or not the message has been distributed actually. If it is confirmed that the message has not been distributed yet, it is possible to redistribute the message or record that as an error log. In order to perform the confirmation, it is possible to adopt the configuration shown in FIG. 24. While the functional units in each apparatus are configured similarly, the feature that the messaging server 50 distributes the message to the information processing apparatus 10 too is different from the embodiment shown in FIG. 10.

Figure 24:
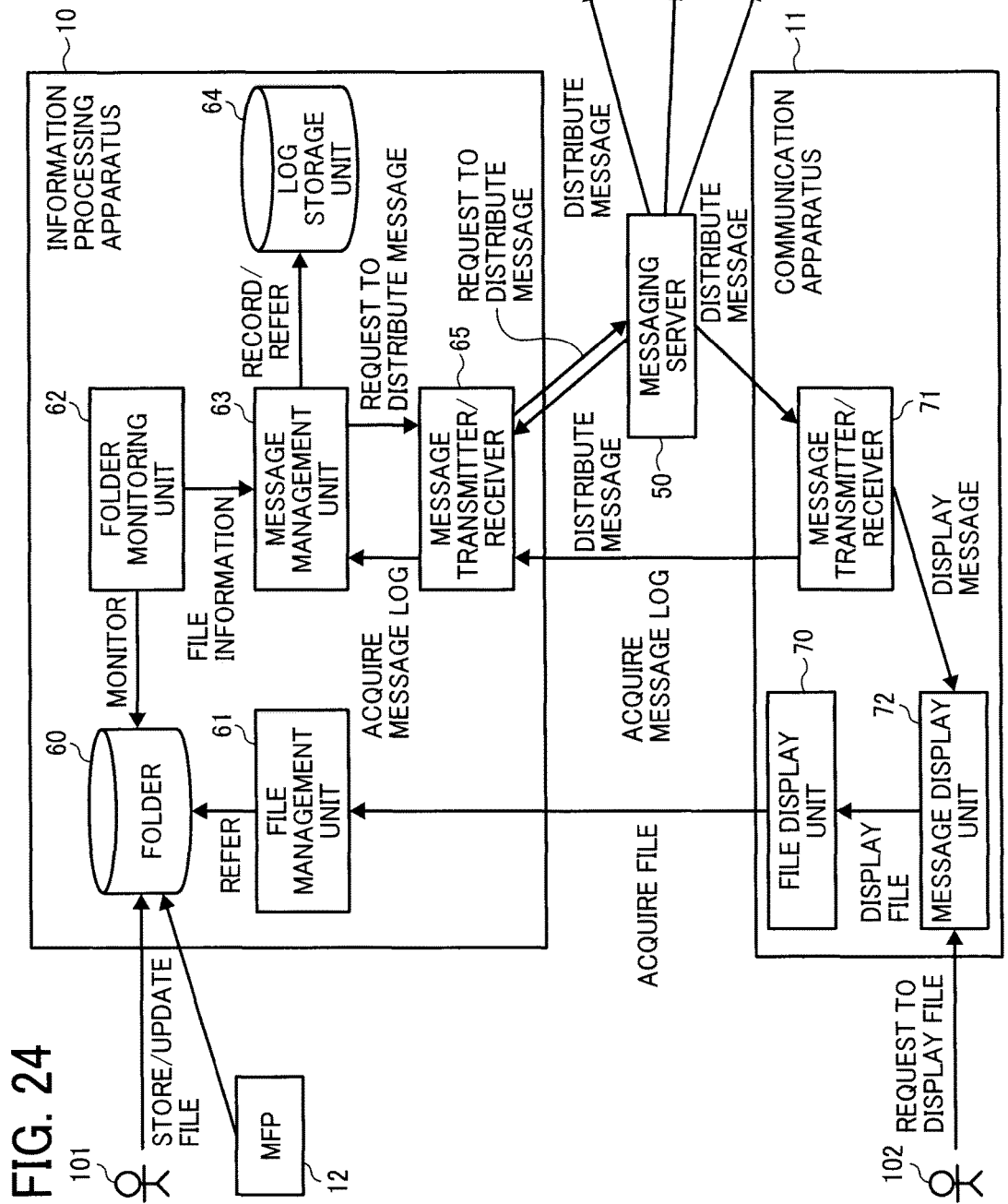
FIG. 24 is a diagram illustrating another process performed among the information processing apparatus, the communication apparatus, and the messaging server included in the information processing system in FIG. 10.

In FIG. 24, after the message transmitter/receiver 65 in the information processing apparatus 10 requests the messaging server 50 to distribute the message, the messaging server 50 distributes the message to the communication apparatus 11. In addition, the messaging server 50 distributes the message to the information processing apparatus 10 that requests the distribution too. As a result, the information processing apparatus 10 can confirm that the messaging server 50 distributes the message.

The message management unit 63 in the information processing apparatus 10 functions as a determination unit and determines whether or not the messaging server 50 succeeds in distributing the message to the communication apparatus 11 and other communication apparatuses 51, 52 and 53 in accordance with the result of receiving the message from the messaging server 50. Subsequently, the message management unit 63 records the determination result in the log storage unit. As a result, it is possible to trace the result of the message distribution later.

The message transmitter/receiver 65 also functions as a retransmission unit, and the message transmitter/receiver 65 can retransfer the message to the communication apparatus 11 via the messaging server 50 in response to the instruction from the message management unit 63. By performing the retransmission, it is possible to improve the success rate of the message distribution.

Figure 25:
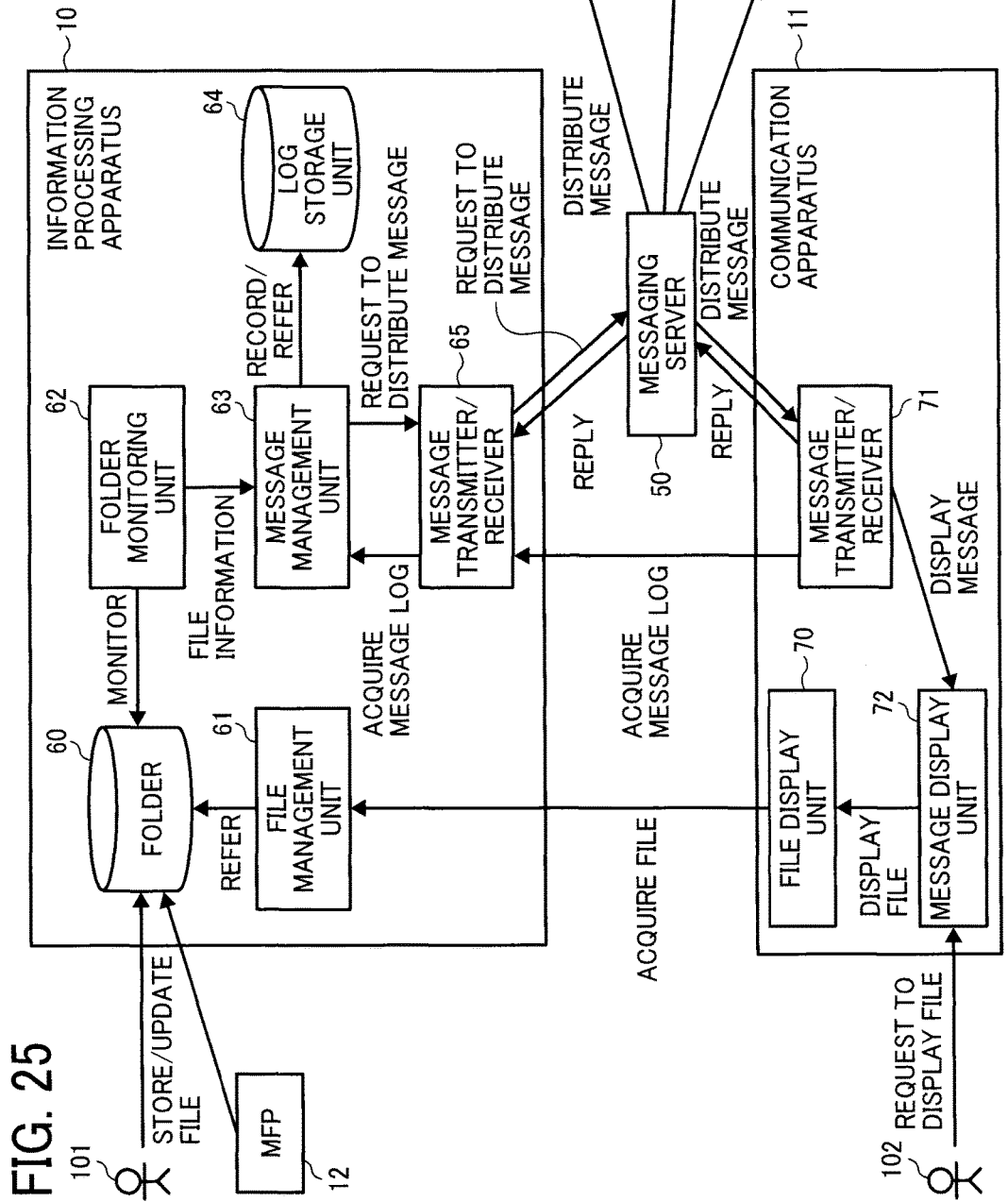
FIG. 25 is a diagram illustrating yet another process performed among the information processing apparatus, the communication apparatus, and the messaging server included in the information processing system in FIG. 10.

In the embodiment shown in FIG. 24, while it is possible to confirm that the messaging server 50 distributes the message, whether or not the message has been distributed to the communication apparatus 11 as the distribution destination cannot be confirmed. To cope with this issue, it is possible to adopt the configuration shown in FIG. 25. In FIG. 25, the configurations of the functional units are similar to those shown in FIG. 10 and FIG. 24. However, the communication apparatus 11 sends back the reply that indicates that the communication apparatus 11 receives the message to the messaging server 50, and the messaging server 50 transfers the reply to the information processing apparatus 10 that requests the message distribution. As described above, the messaging server 50 receives the reply that the message has been distributed from the distribution destination and sends back the reply to the apparatus that requests the message distribution. Consequently, it is possible to confirm that the message has been distributed to the distribution destination.

As described above, the information processing apparatus 10 includes the storing units such as the file storage area 40 and the folder 60 that store files and detection units such as the detector 30 that detects that a file has been added or updated and the folder monitoring unit 62. In addition, the information processing apparatus 10 includes the generating units such as the transmission processor 32 and the message management unit 63 that generates the display information as the file list and the message to display the added/updated file on the communication apparatus 11 connectable to the information processing apparatus 10. In addition, the information processing apparatus 10 also includes the transmission units such as the transmission processor 32 and the message transmitter/receiver 65 that transfers the display information to the communication apparatus 11. The information processing apparatus 10 can be configured by including at least these storing units, detection units, generation units, and transmission units.

In FIG. 23, the file message is displayed by selecting "All". However, it is possible to display the message regarding the file process by creating a "File process" group and selecting the "File process" group. In this case, in transferring the message regarding the file process, the information processing apparatus 10 considers the "File process" group that the user to whom the message is transferred belongs as the destination. As a result, the user can distinguish the message as the notice of finishing the file process from the message from other users such as chat etc. easily.

The unread file folder can be linked to the message. Consequently, if the user selects the link in the reported message, the list of files not browsed yet can be displayed. As a result, in case of checking multiple files, it is possible to check unread files at one time without sequencing through operations, selecting the link in the reported message, displaying the linked file, returning to the message screen, searching for the notification message of unchecked file, and selecting the link in the reported message repeatedly.

In the second embodiment, information on user to whom the message is transferred is associated with each folder.

However, this is not limited to the case. If a folder that the file is added or updated is a user folder, it is possible to distribute the message to users accessible to the user folder.

In FIG. 13D, the process that selects the distribution destination is described. However, this is not limited to that case. For example, in case of instructing to upload or convert a file in FIG. 13C, the communication apparatus 11 transfers information that identifies the user who uses the communication apparatus 11. After finishing adding or updating the file, the information processing apparatus 10 transfers a message to the user identified by the information transferred from the communication apparatus 11. As a result, it is possible to report the message to the user who instructs the information processing apparatus 10 to perform the process. In addition, the user can receive the notification without setting himself/herself as the destination.

The present invention also encompasses an information processing method performed by an information processing system. The method includes the step of storing a file and being associated with user identification information, storing link information to access the file and be associated with each of multiple pieces of user identification information, receiving a request to add a file to a first storage area and store the file in the first storage area in response to the request, generating link information to access the file stored in the first storage area by a storage processor in a second storage area associated with the user identification information associated with the first storage area, requesting a notification unit to report received information to a communication apparatus identified by received identification information to perform notification by transferring information that indicates that a file has been added in response to addition of the file to the first storage area by the storage processer and the identification information that identifies a communication apparatus corresponding to the user identification information associated with the first storage area, and transferring the link information stored in the second storage area associated with user identification information corresponding to a communication apparatus in response to a request from the communication apparatus connected to the information processing apparatus and transferring a file to the communication apparatus in response to access of the file using the link information transferred from the communication apparatus.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The illustrated server apparatuses are only illustrative of one of several computing environments for implementing the embodiments disclosed herein. For example, in some embodiments, any one of the apparatuses on the system, such as the information processing apparatus and the server, may include a plurality of computing devices, e.g., a server cluster, that are configured to communicate with each other over any type of communications link, including a network, a shared memory, etc. to collectively perform the processes disclosed herein.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing apparatus, comprising:
a memory including:
   a first storage area associated with user identification information; and
   a second storage area associated with the user identification information that is associated with the first storage area; and
processing circuitry configured to:
   store a file in the first storage area in response to a request for adding the file to the first storage area;
   generate link information to access the file stored in the first storage area, and store the link information in the second storage area that is associated with the user identification information associated with the first storage area;

request a notification server to transmit a notification that indicates that the file has been newly added to the first storage area, with identification information that identifies a communication apparatus that corresponds to the user identification information associated with the first storage area;

transfer, in response to a request from the communication apparatus that receives the notification, the link information of the newly added file stored in the second storage area associated with the user identification information corresponding to the communication apparatus, and to further transfer, in response to a request to access the newly added file by the communication apparatus using the link information, the newly added file obtained from the first storage area to the communication apparatus;

delete the link information to access the file from the second storage area associated with the user identification information corresponding to the communication apparatus in response to transferring of the file obtained using the link information to the communication apparatus; and report a number of unread files stored in the second storage area to the communication apparatus, and to change the number of unread files stored in the second storage area when the link information is deleted from the second storage area.

2. The information processing apparatus according to claim 1, wherein, when the first storage area of the memory is associated with a process to be performed on a first file stored in the first storage area, the processing circuitry is further configured to perform the process associated with the first storage area on the first file in response to storing the first file in the first storage area, and to request the notification server to send a notification indicating that the process performed on the first file in the first storage area is finished in response to finishing of the process performed on the first file in the first storage area.

3. The information processing apparatus according to claim 1, wherein
the first storage area of the memory is associated with a process that generates a second file based on a first file stored in the first storage area, and
the processing circuitry is further configured to perform the process that generates the second file, which is associated with the first storage area, based on the first file in response to storing the first file in the first storage area, and to request the notification server to send a notification indicating that the process that generates the second file is finished in response to finishing of the process that generates the second file being performed on the first file in the first storage area.

4. The information processing apparatus according to claim 1, wherein the processing circuitry is further configured to transfer a number of link information stored in the second storage area associated with the user identification information to the notification server.

5. An information processing system comprising:
a first storage area associated with user identification information;
a second storage area associated with the user identification information that is associated with the first storage area; and
an information processing apparatus including circuitry configured to implement:
a storage processor to store a file in the first storage area in response to a request for adding the file to the first storage area;
a generator to generate link information to access the file stored in the first storage area, and to store the link information in the second storage area that is associated with the user identification information associated with the first storage area;
a notification requester to request a notification server to transmit a notification indicating that the file has been newly added to the first storage area, with identification information that identifies a communication apparatus that corresponds to the user identification information associated with the first storage area; and
a transmitter to transfer, in response to a request from the communication apparatus that receives the notification, the link information of the newly added file stored in the second storage area associated with the user identification information corresponding to the communication apparatus, and to further transfer, in response to a request to access the newly added file by the communication apparatus using the link information, the newly added file obtained from the first storage area to the communication apparatus, wherein
the circuitry is configured to delete the link information to access the file from the second storage area associated with the user identification information corresponding to the communication apparatus in response to transferring of the file obtained using the link information to the communication apparatus, and
the circuitry is configured to report a number of unread files stored in the second storage area to the communication apparatus, and to change the number of unread files stored in the second storage area when the link information is deleted from the second storage area.

6. The system of claim 5, wherein, when the first storage area is associated with a process to be performed on a first file stored in the first storage area, the circuitry is configured to perform the process associated with the first storage area on the first file in response to storing the first file in the first storage area, and to request the notification server to send the notification indicating that the process performed on the first file in the first storage area is finished in response to finishing of the process performed on the first file in the first storage area.

7. The system of claim 5, wherein
the first storage area is associated with a process that generates a second file based on a first file stored in the first storage area, and
the circuitry is configured to perform the process that generates the second file, which is associated with the first storage area, based on the first file in response to storing the first file in the first storage area, and to request the notification server to send the notification indicating that the process that generates the second file is finished in response to finishing of the process that generates the second file being performed on the first file in the first storage area.

8. The system of claim 5, wherein the circuitry is configured to transfer a number of link information stored in the second storage area associated with the user identification information to the notification server.

9. A non-transitory, computer-readable recording medium storing a program that, when executed by one or more processors, causes the one or more processors to implement a method of processing information, the method comprising:
storing, by an information processing apparatus, a file in a first storage area associated with user identification information, in response to a request for adding the file to the first storage area;
generating, by the information processing apparatus, link information to access the file stored in the first storage area, and storing the link information in a second storage area that is associated with the user identification information associated with the first storage area;
requesting a notification server to transmit a notification indicating that the file has been newly added to the first storage area, with identification information that identifies a communication apparatus that corresponds to the user identification information associated with the first storage area;
transferring, by the information processing apparatus in response to a request from the communication apparatus that receives the notification, the link information of the newly added file stored in the second storage area associated with the user identification information corresponding to the communication apparatus;
transferring, in response to a request to access the newly added file by the communication apparatus using the link information, the newly added file obtained from the first storage area to the communication apparatus;
deleting the link information to access the file from the second storage area associated with the user identification information corresponding to the communication apparatus in response to transferring of the file obtained using the link information to the communication apparatus;
reporting a number of unread files stored in the second storage area to the communication apparatus, and changing the number of unread files stored in the second storage area when the link information is deleted from the second storage area.

10. The information processing apparatus according to claim 1, wherein
the first storage area and the second storage area are folders, and
the processing circuitry is configured to transfer information corresponding to a folder list, including information on a folder in the second storage area, in response to receiving a request for acquiring the folder list of the information processing apparatus from the communication apparatus.

11. The system of claim 5, wherein
the first storage area and the second storage area are folders, and
the circuitry is configured to transfer information corresponding to a folder list, including information on a folder in the second storage area, in response to receiving a request for acquiring the folder list of the system from the communication apparatus.

12. The information processing apparatus according to claim 1, wherein the processing circuitry is configured to request the notification server to transmit the notification that indicates that the file has been newly added to the first storage area in response to the file being newly added to the first storage area.

13. The system of claim 5, wherein the circuitry is configured to request the notification server to transmit the notification indicating that the file has been newly added to the first storage area in response to the file being newly added to the first storage area.

14. The information processing apparatus according to claim 1, wherein, users identified by the user identification information in the first storage area and the second storage area are the same.

* * * * *